United States Patent
Stutika et al.

(10) Patent No.: US 9,776,532 B2
(45) Date of Patent: Oct. 3, 2017

(54) EASY ENTRY SEAT TRACK ADJUSTER

(71) Applicant: LEAR CORPORATION, Southfield, MI (US)

(72) Inventors: Peter Stutika, Presov (SK); Peter Jenco, Presov (SK); Martin Kravcik, Presov (SK)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/959,557

(22) Filed: Dec. 4, 2015

(65) Prior Publication Data

US 2016/0090011 A1    Mar. 31, 2016

Related U.S. Application Data

(63) Continuation-in-part of application No. 14/477,991, filed on Sep. 5, 2014, now Pat. No. 9,340,125.

(60) Provisional application No. 61/880,394, filed on Sep. 20, 2013, provisional application No. 62/087,767, filed on Dec. 4, 2014.

(51) Int. Cl.
| | |
|---|---|
| *F16M 13/00* | (2006.01) |
| *B60N 2/08* | (2006.01) |
| *B60N 2/07* | (2006.01) |
| *B60N 2/12* | (2006.01) |

(52) U.S. Cl.
CPC ......... *B60N 2/0881* (2013.01); *B60N 2/0732* (2013.01); *B60N 2/12* (2013.01); *B60N 2002/126* (2013.01)

(58) Field of Classification Search
CPC ............................ B60N 2/0705; B60N 2/0722
See application file for complete search history.

(56) References Cited

U.S. PATENT DOCUMENTS

| | | | |
|---|---|---|---|
| 4,569,557 A | 2/1986 | Goforth | |
| 4,639,038 A | 1/1987 | Heling | |
| 4,852,846 A | 8/1989 | Weier | |
| 4,856,847 A | 8/1989 | Kanai | |
| 5,137,331 A | 8/1992 | Colozza | |
| 5,522,643 A | 6/1996 | Matsuura | |
| 5,527,087 A | 6/1996 | Takeda et al. | |
| 5,570,931 A | 11/1996 | Kargilis et al. | |

(Continued)

FOREIGN PATENT DOCUMENTS

| | | |
|---|---|---|
| DE | 102009033892 A1 | 2/2011 |
| DE | 10020923 A1 | 12/2011 |
| DE | 102013214175 A1 | 11/2014 |

OTHER PUBLICATIONS

English Language Abstract of WO 2014/177351 A1 (PCT equivalent of DE 102013214175).

(Continued)

*Primary Examiner* — Amy Sterling
(74) *Attorney, Agent, or Firm* — Fishman Stewart PLLC

(57) ABSTRACT

A seat adjuster may include an end stop bracket and an easy entry lever. An easy entry lever may be configured to rotate between a first position in which the easy entry lever engages the end stop bracket and prevents movement of a seat from a comfort range into an easy entry range, and a second position in which the easy entry lever does not prevent movement of the seat from the comfort range into the easy entry range. A cross member may be connected via one or more cables to one or more comfort lever activators.

20 Claims, 20 Drawing Sheets

(56) References Cited

U.S. PATENT DOCUMENTS

| | | | |
|---|---|---|---|
| 5,597,206 A | 1/1997 | Ainsworth et al. |
| 5,683,140 A | 11/1997 | Roth et al. |
| 5,855,413 A | 1/1999 | Couasnon et al. |
| 5,882,074 A | 3/1999 | Kojima |
| 5,899,532 A | 5/1999 | Paisley et al. |
| 5,944,383 A | 8/1999 | Mathey et al. |
| 6,086,154 A | 7/2000 | Mathey et al. |
| 6,089,521 A | 7/2000 | Tarusawa et al. |
| 6,098,946 A | 8/2000 | Sechet et al. |
| 6,152,533 A | 11/2000 | Smuk |
| 6,227,596 B1 | 5/2001 | Foucault et al. |
| 6,231,123 B1 | 5/2001 | Tame |
| 6,336,679 B1 | 1/2002 | Smuk |
| 6,341,819 B1 | 1/2002 | Kojima et al. |
| 6,439,531 B1 | 8/2002 | Severini et al. |
| 6,619,741 B1 | 9/2003 | Tame |
| 6,631,879 B2 | 10/2003 | Hibino et al. |
| 6,666,512 B1 | 12/2003 | Timon |
| 6,767,063 B1 | 7/2004 | Abdella et al. |
| 6,926,364 B2 | 8/2005 | Cooley et al. |
| 6,935,691 B1 | 8/2005 | Sasaki et al. |
| 7,014,263 B2 | 3/2006 | Mukoujima et al. |
| 7,025,419 B2 | 4/2006 | Sasaki et al. |
| 7,059,679 B2 | 6/2006 | Yamada |
| 7,090,188 B2 | 8/2006 | Severini et al. |
| 7,097,250 B2 | 8/2006 | Rausch et al. |
| 7,137,667 B2 | 11/2006 | Habedank |
| 7,140,683 B2 | 11/2006 | Rausch et al. |
| 7,152,923 B2 | 12/2006 | Charras et al. |
| 7,172,253 B2 | 2/2007 | Haverkamp |
| 7,434,883 B2 | 10/2008 | Deptolla |
| 7,434,884 B2 | 10/2008 | Becker et al. |
| 7,517,022 B2 | 4/2009 | Haberdank et al. |
| 7,562,926 B2 | 7/2009 | Kojima |
| 7,594,634 B2 | 9/2009 | Garotte et al. |
| 7,600,802 B2 | 10/2009 | Kojima |
| 7,628,441 B2 | 12/2009 | Quast |
| 7,926,875 B2 | 4/2011 | Schmale |
| 8,205,944 B2 | 6/2012 | Watanabe |
| 8,517,328 B2 | 8/2013 | Wieclawski et al. |
| 8,585,145 B2 | 11/2013 | Nock et al. |
| 8,777,314 B2 | 7/2014 | Nock et al. |
| 9,340,125 B2 * | 5/2016 | Stutika ............... B60N 2/0722 |
| 2008/0309136 A1 | 12/2008 | Kojima et al. |
| 2011/0012004 A1* | 1/2011 | Wieclawski ......... B60N 2/0705 |
| | | | 248/429 |
| 2011/0012005 A1 | 1/2011 | Jahner et al. |
| 2011/0049954 A1 | 3/2011 | Watanabe |
| 2011/0148164 A1 | 6/2011 | Oori |
| 2012/0119548 A1 | 5/2012 | Abraham et al. |
| 2012/0168595 A1 | 7/2012 | Gray et al. |
| 2012/0181833 A1 | 7/2012 | Nock et al. |
| 2012/0187734 A1 | 7/2012 | Stoia et al. |
| 2012/0217781 A1 | 8/2012 | Nock et al. |
| 2012/0223561 A1 | 9/2012 | Hurst, III et al. |
| 2012/0261964 A1 | 10/2012 | Yamaguchi et al. |
| 2012/0280548 A1 | 11/2012 | Nock et al. |

OTHER PUBLICATIONS

English Language Abstract of DE 10020923 A1.
English Language Abstract of DE 102009033892 A1.
English Language Abstract of DE 102013214175 A1.
Office Action issued in corresponding German Patent Application No. 10 2014 217 754.5 (May 11, 2015).

* cited by examiner

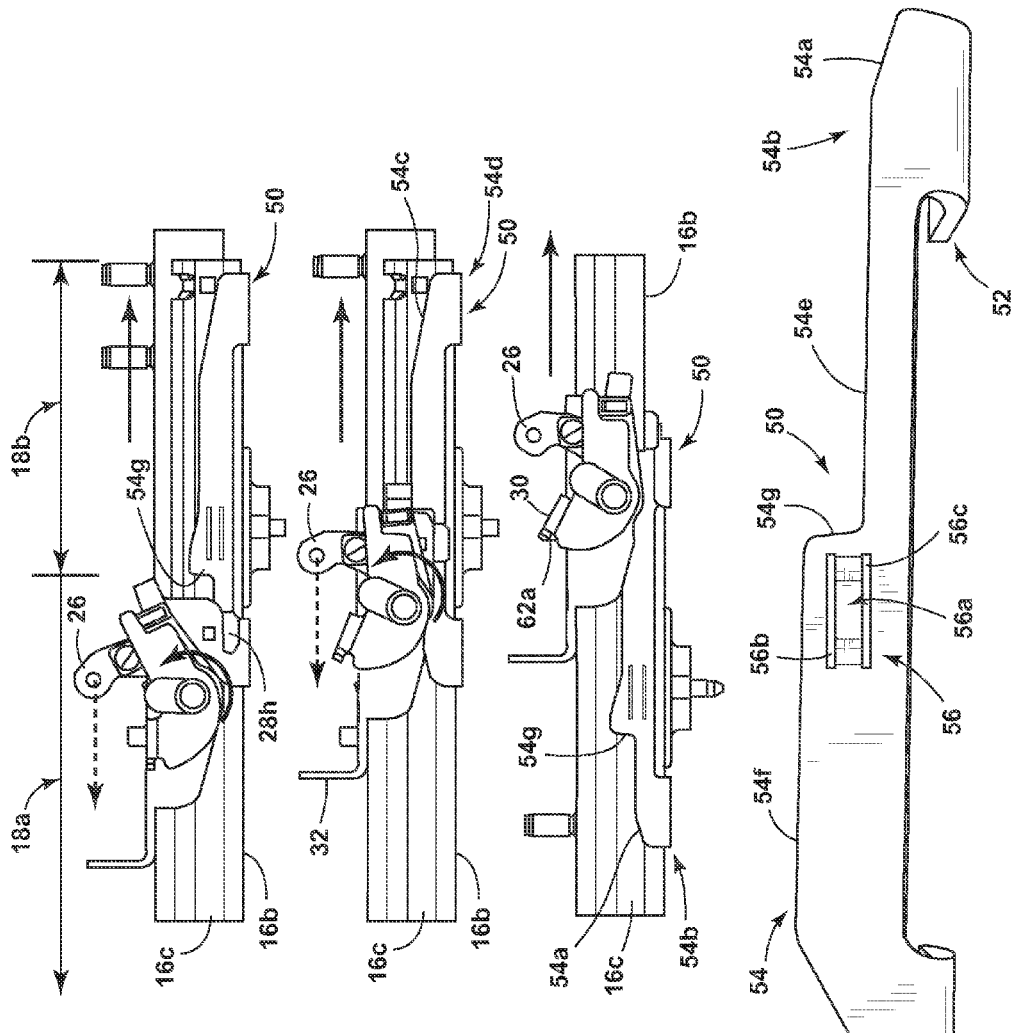

EASY ENTRY SEAT TRACK ADJUSTER

CROSS-REFERENCE TO RELATED APPLICATIONS

This application is a continuation-in-part of U.S. patent application Ser. No. 14/477,991, filed on Sep. 5, 2014, which claims the benefit of U.S. Provisional Patent Application Ser. No. 61/880,394, filed Sep. 20, 2013. This application claims the benefit of U.S. Provisional Patent Application Ser. No. 62/087,767, filed Dec. 4, 2014. The entire disclosures of all of the above applications are hereby incorporated by reference herein as though fully set forth in their entireties.

TECHNICAL FIELD

The present disclosure generally relates to track adjusters that may be used, for example, in connection with vehicle seats.

BACKGROUND

Easy entry seat assemblies can be used in vehicles that have multiple rows of seats to provide easy entry to a rear row of seats in the vehicle. For example, a typical easy entry seat assembly may have a backrest that is pivotally supported relative to a seat bottom for movement between an upright seated position, a forward easy entry position, or a fold flat position. A typical easy entry assembly may allow the seat bottom to move forward beyond a comfort range of seating positions.

SUMMARY

In embodiments, a seat adjuster may comprise an end stop bracket configured for connection with a fixed track, an easy entry lever, a comfort lever activator configured for connection or engagement with a lockset, a cross member bracket that may be configured for connection with a movable track and configured to rotatably support a cross member, and/or a cross member cable that may connect the comfort lever activator to said cross member such that rotation of said cross member may cause the comfort lever activator to rotate and to connect with and/or engage said lockset. In embodiments, the easy entry lever may be configured to rotate between a first position in which the easy entry lever may connect with and/or engage the end stop bracket and may prevent movement of a seat from a comfort range into an easy entry range, and a second position in which the easy entry lever may not impede or prevent movement of the seat from the comfort range into the easy entry range.

In embodiments, a vehicle seat adjuster may comprise a first fixed track, a second fixed track, a first movable track that may be coupled to slide relative to the first fixed track, a second movable track that may be coupled to slide relative to the second fixed track, an end stop bracket that may be connected to the first fixed track, an easy entry lever that may be connected to the first movable track, a cross member, and/or a comfort lever activator that may be connected to the first movable track and may be configured for connection and/or engagement with a lockset. In embodiments, a vehicle seat adjuster may include a first cross member bracket that may be connected to the first movable track and may be configured to rotatably support a first end of the cross member. In embodiments, a vehicle seat adjuster may include a second cross member bracket that may be connected to the second movable track and may be configured to rotatably support a second end of the cross member. In embodiments, a vehicle seat adjuster may include a cross member cable that may connect the comfort lever activator to said cross member such that rotation of said cross member causes the comfort lever activator to rotate and to connect with and/or engage said lockset. In embodiments, the easy entry lever may be configured to rotate between a first position in which the easy entry lever may engage the end stop bracket and impede or prevent movement of the first movable track from a comfort range into an easy entry range, and a second position in which the easy entry lever may not prevent movement of the first movable track from the comfort range into the easy entry range.

Various aspects of the present disclosure will become apparent to those skilled in the art from the following detailed description of the various embodiments, when read in light of the accompanying drawings.

BRIEF DESCRIPTION OF THE DRAWINGS

FIGS. 5A, 5B, and 5C are side views generally illustrating portions of a vehicle seat adjuster, in accordance with embodiments of the present disclosure.

FIG. 5D is a perspective view generally illustrating portions of a vehicle seat adjuster, in accordance with embodiments of the present disclosure.

DETAILED DESCRIPTION

Figure 1A:
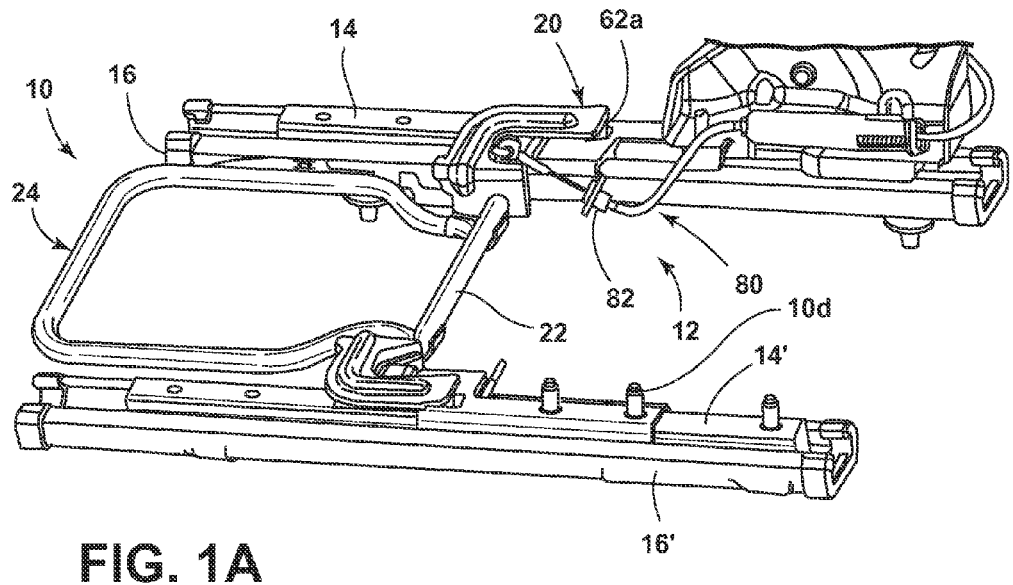
FIGS. 1A and 1B are perspective views generally illustrating portions of vehicle seat adjuster, in accordance with embodiments of the present disclosure.
Figure 1B:
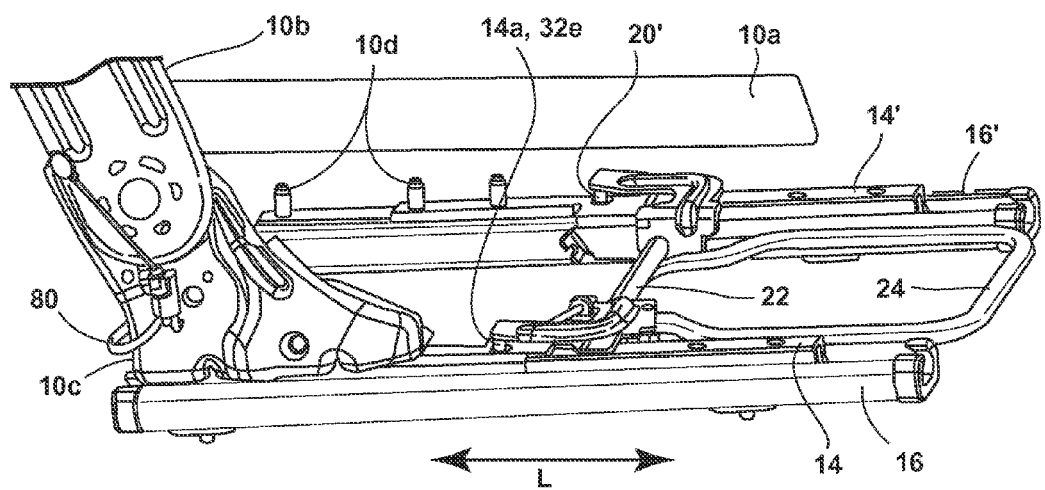

Referring now to the drawings, there is generally illustrated in FIGS. 1A and 1B a vehicle seat portion 10 including a track adjuster, indicated generally at 12, in accordance with an embodiment of the present disclosure. In embodiments, vehicle seat portion 10 may include a seat cushion 10a, a seatback 10b, and/or a seat frame 10c. In embodiments, vehicle seat adjuster 12 may permit vehicle seat portion 10 to be adjusted by a user in a longitudinal direction L. Vehicle seat adjuster 12 may include easy entry (EE) functionality, which may facilitate ingress and/or egress of a vehicle occupant and/or cargo. It should be appreciated, however, that vehicle seat adjuster 12 can be used in any appropriate environment and for any desired purpose, which may or may not be in connection with a vehicle and/or a seat.

In embodiments, vehicle seat adjuster 12 may include one or more first seat tracks 14, 14' and/or one or more second seat tracks 16, 16'. Second seat tracks 16, 16' may be connected and/or fixed to a base and/or floor, such as of a vehicle. First tracks 14, 14' may be operatively coupled to second tracks 16, 16', respectively, to slide along second tracks 16, 16' (e.g., first tracks 14, 14' may comprise movable tracks). One or more locking devices 20, 20' may be connected to first tracks 14, 14' and/or second tracks 16, 16'. Locking device 20 may be configured to restrict relative movement between first and second tracks 14, 16 and/or locking device 20' may be configured to restrict relative movement between first and second tracks 14', 16'.

In embodiments, such as generally illustrated in FIGS. 1A-1C and 2, seat adjuster 12 may include a locking device (e.g., locking device 20 and/or 20'), a cross member 22, a handle 24, an easy entry lever activator (EE lever activator) 26, an adjustable end stop lever (EE lever) 28, a comfort lever activator 30, an easy entry base bracket (EE base bracket) 32, and/or an end stop bracket 50. In embodiments, cross member 22 may include a cross tube. EE base bracket 32 may be fixed to first track 14 and may support cross member 22, EE lever activator 26, EE lever 28, and/or comfort lever activator 30. Comfort lever activator 30 may be referred to herein as activation lever 30.

Figure 3A:
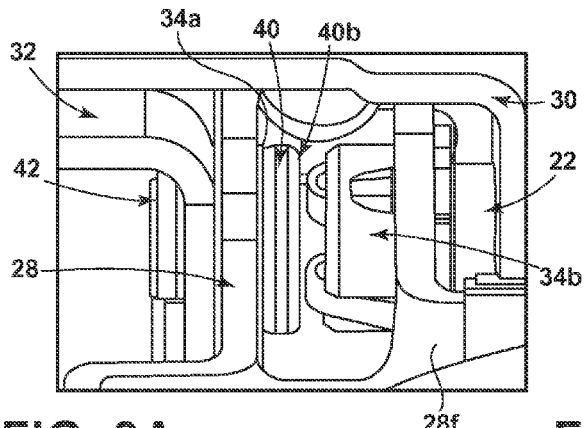
FIG. 3A is an enlarged perspective view generally illustrating portions of a vehicle seat adjuster, in accordance with embodiments of the present disclosure
Figure 3B:
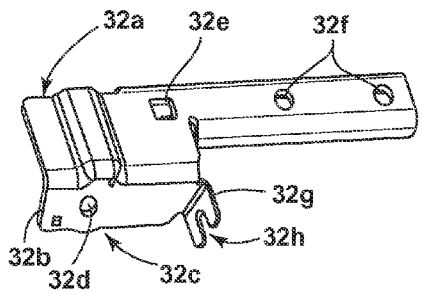
FIG. 3B is a perspective view of a base bracket, in accordance with embodiments of the present disclosure.

As generally illustrated in FIGS. 3A and 3B, for example and without limitation, EE base bracket 32 may be generally L-shaped and may include a generally horizontal portion 32a which may be fixed to a top portion 14b of first track 14 and/or EE base bracket 32 may include a generally vertical portion 32b that may extend downwardly from a side of horizontal portion 32a. In embodiments, EE lever 28 may be rotatably fixed to generally vertical portion 32b, which may include EE lever 28 being configured to rotate relative to vertical portion 32b, and EE lever 28 not being configured to translate to a substantial degree relative to vertical portion 32b. For example, and without limitation, generally vertical portion 32b may include a connecting portion 32c, which may include an aperture 32d configured to receive a connecting member 40 and/or a bushing 34a.

In embodiments, generally horizontal portion 32a may include an aperture 32e configured to receive at least a portion of a lock plate actuator 62 of lockset 60. Generally horizontal portion 32a may, additionally or alternatively, include one or more apertures 32f that may be configured to connect seat frame 10c to EE base bracket 32. In embodiments, seat frame 10c may be connected to EE base bracket 32 via one or more connecting members 10d, which may include studs. EE base bracket 32 may include an angled portion 32g, which may include a recess 32h. Angled portion 32g may be configured to be connected to a connection member 80. For example, and without limitation, connection member 80 may comprise a cable that may include a sheath 82, and angled portion 32g and/or recess 32h may be configured to hold/retain sheath 82. In embodiments, angled portion 32g and/or recess 32h may function as a cable retainer. In embodiments, connection member 80 may be referred to herein as easy entry cable 80, but is not limited to a cable.

As generally illustrated in FIGS. 3A-3D, connecting member 40 may be configured to connect EE base bracket 32 and EE lever 28. Connecting member 40 may take a variety of forms, and may include, without limitation, a body portion 40a and/or a head portion 40b. Connecting member 40 may be generally cylindrical and/or head portion 40b may have a greater diameter than body portion 40a. For example, and without limitation, connecting member 40 may include a rivet. Connecting member 40 may be configured to be connected to a retaining member 42. Retaining member 42 may include, for example, a star lock washer that may be configured to retain connecting member 40 in EE base bracket aperture 32d.

In embodiments, EE lever 28 may be supported by EE base bracket 32 via connecting member 40. For example, and without limitation, EE lever 28 may include an aperture 28a that may be configured to receive at least a portion of connecting member 40. Bushing 34a may be arranged on connecting member 40 and/or may be arranged between EE lever 28 and connecting member 40 to facilitate rotational movement of EE lever 28 relative to EE base bracket 32.

In embodiments, EE lever 28 may be configured to rotatably support cross member 22. For example, and without limitation, EE lever 28 may include a cross member connecting portion 28b. Cross member connecting portion 28b may include an aperture 28c that may be configured to receive at least a portion of cross member 22 and/or cross member 22 may be rotatably supported in aperture 28c of EE lever 28. Cross member connecting portion 28b may be connected to and/or configured to receive a bushing 34b that may be configured to receive at least a portion of cross member 22, and/or at least a portion of cross member 22 may extend into aperture 28c. Bushing 34b may be configured to facilitate relative movement between cross member 22 and EE lever 28. For example, and without limitation, bushing 34b may be arranged in cross member connecting portion 28b and a portion of cross member 22 may be inserted into bushing 34b such that cross member 22 may be able to rotate within bushing 34b and/or bushing 34b may be configured not to rotate relative to EE lever 28. In embodiments, cross member 22 may be configured to rotate independently of EE lever 28 in at least some positions of EE lever 28. For example, and without limitation, cross member 22 may be rotated by handle 24 without rotation of EE lever 28, which may allow for first tracks 14, 14' to move within comfort range 18a, but may not allow first tracks 14, 14' to move into EE range 18b (see, e.g., FIG. 5A). In embodiments, cross member 22 and EE lever 28, which may include EE lever activator 26, cross member connecting portion 28b, EE lever protrusion 28d, and/or flexible member 28g, may be configured to rotate about axes that are parallel and/or coincident to each other.

In embodiments, EE lever 28 may include a cross member actuator 28f. Cross member actuator 28f may be configured to cause cross member 22 to rotate in at least one direction, which may include cross member actuator 28f contacting comfort lever activator 30. For example, and without limitation, cross member actuator 28f may be configured to transfer rotational movement of EE lever 28 to cross member 22 via contact with comfort lever activator 30, which may be fixed to cross member 22. A flexible member 28g may be arranged between cross member actuator 28f and comfort lever activator 30 and may prevent actual contact and/or may absorb forces corresponding to contact between cross member actuator 28f and comfort lever activator 30.

In embodiments, EE lever 28 may be generally u-shaped, which may include EE lever activator 26 and/or EE lever protrusion 28d on one side, and cross member connecting portion 28b, cross member actuator 28f, and/or flexible member 28g at the other side. In embodiments, portions and/or all of bushing 34b and/or connecting member 40 may be disposed between the two sides. In embodiments, EE lever 28 may be formed as a single unitary element, and may include, for example, EE lever activator 26, EE lever protrusion 28d, EE lever angled portion 28e, cross member actuator 28f, flexible member 28g, and/or movement restricting element 28h.

Figure 4A:
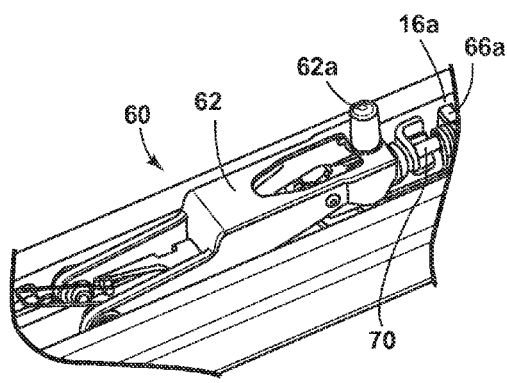
FIGS. 4A and 4B are perspective views generally illustrating portions of a vehicle seat adjuster, in accordance with embodiments of the present disclosure.
Figure 4B:
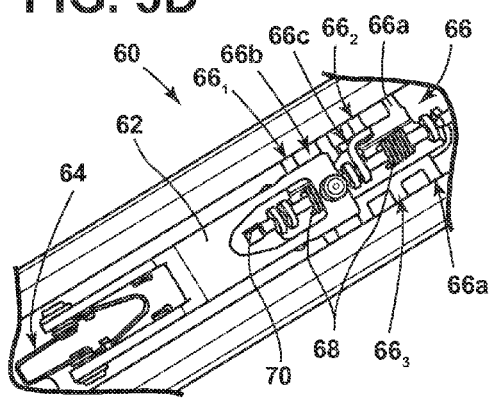

As generally illustrated in FIGS. 4A and 4B, a locking device (e.g., locking device 20, and/or locking device 20') may include a lockset 60 that may be arranged between first and second tracks (e.g., tracks 14, 16 and/or track 14', 16'). For example, and without limitation, lockset 60 may be configured to selectively engage engagement portions 16a of second track 16. Lockset 60 may include a lock plate actuator 62, a lock plate actuator spring 64, one or more lock plates 66, and/or one or more lock plate springs 68.

In embodiments, lock plates 66 may include one or more teeth 66a and/or one or more recesses 66b. Teeth 66a may be configured to engage engagement portions 16a. Recesses 66b may be configured to receive at least a portion of engagement portions 16a.

In embodiments, lock plates 66 may be arranged in a variety of ways. For example, and without limitation, lock plates 66 may include first lock plate $66_1$, second lock plate $66_2$, and/or third lock plate $66_3$. First, second, and/or third lock plates $66_1$, $66_2$, $66_3$ may be coupled to a lock plate support 70 and each may be coupled to move and/or rotate relative to lock plate support 70. Lock plates 66 may rotate between a first position in which lock plate teeth 66a engage engagement portions 16a, and a second position in which lock plate teeth 66a are disengaged from engagement portions 16a. If all of lock plates 66 are in the second/disengaged position, relative movement between first and second tracks 14, 16 may be permitted. If one or more of lock plates 66 are at or near the first position, the one or more lock plates may be at least partially engaged with an engagement portion 16a, and relative movement between the first and second tracks 14, 16 may be restricted. Lock plates 66 may be configured to move together and/or may be configured to move independently from each other. One or more of lock plates 66 may be configured to move together in a first direction and move independently from each other in a second direction. A lock plate 66 may include an extending portion 66c that may be configured to cause at least one other lock plate 66 to move and/or rotate in at least one of the first direction and the second direction. For example, and without limitation, first lock plate $66_1$ may include an extension that may be configured to cause second lock plate $66_2$ to rotate downward when first lock plate $66_1$ rotates downward.

In embodiments, lock plate actuator 62 may be rotatably coupled to first track 14 and may be configured to rotate between a first position in which lock plate actuator 62 contacts at least one of lock plates 66 and a second position in which lock plate actuator 62 does not contact lock plates 66. Lock plate actuator spring 64 may be coupled to bias lock plate actuator 62 toward at least one of the first position and the second position. Lock plate actuator 62 may include a protrusion 62a that may be configured to extend through an aperture 14a in first track 14 and/or an aperture 32e in EE base bracket 32. Protrusion 62a may be configured to contact comfort lever activator 30. For example, and without limitation, rotation of comfort lever activator 30 may cause comfort lever activator 30 to contact/depress protrusion 62a, which may cause lock plate actuator 62 to rotate, which may cause lock plates 66 to rotate between the first and second lock plate positions.

In embodiments, lock plate springs 68 may be configured to bias lock plates 66 toward at least one of the first and second lock plate positions. For example, and without limitation, lock plate springs 68 may be configured to bias lock plates 66 toward the first lock plate position.

In embodiments, comfort lever activator 30 may be fixed to rotate with cross member 22. Comfort lever activator 30 may be configured to contact at least a portion of lockset 60. For example, and without limitation, comfort lever activator 30 may be configured to contact protrusion 62a.

In embodiments, such as generally illustrated in FIGS. 5A-5D, vehicle seat adjuster 12 may include an end stop bracket 50, which may be fixed to the second track 16. For example, and without limitation, end stop bracket 50 may include a generally L-shaped cross section, including at least one generally horizontal portion 52 that may be configured to be attached to second track 16 (e.g., bottom portion 16b of second track 16), and/or a generally vertical portion 54 that may extend generally upward from a side of generally horizontal portion 52. Generally vertical portion 54, may, additionally or alternatively, be configured to be attached to second track 16 (e.g., side portion 16c of second track 16). In embodiments, generally vertical portion 54 may be generally planar and/or may be disposed generally parallel to side portion 16c of second track 16.

In embodiments, generally vertical portion 54 may include one or more ramped portions. For example, and without limitation, end stop bracket 50 may include a upwardly ramped portion 54a at or near a rear end 54b of end stop bracket 50 and/or a downwardly ramped portion 54c at or near a front end 54d of end stop bracket 50. End stop bracket vertical portion 54 may include a lower portion 54e, an upper portion 54f, and an intermediate vertical portion 54g, which may be disposed between lower portion 54e and upper portion 54f. In embodiments, end stop bracket 50 may be formed as single, unitary element and/or may not be configured to translate and/or rotate.

Figure 2:
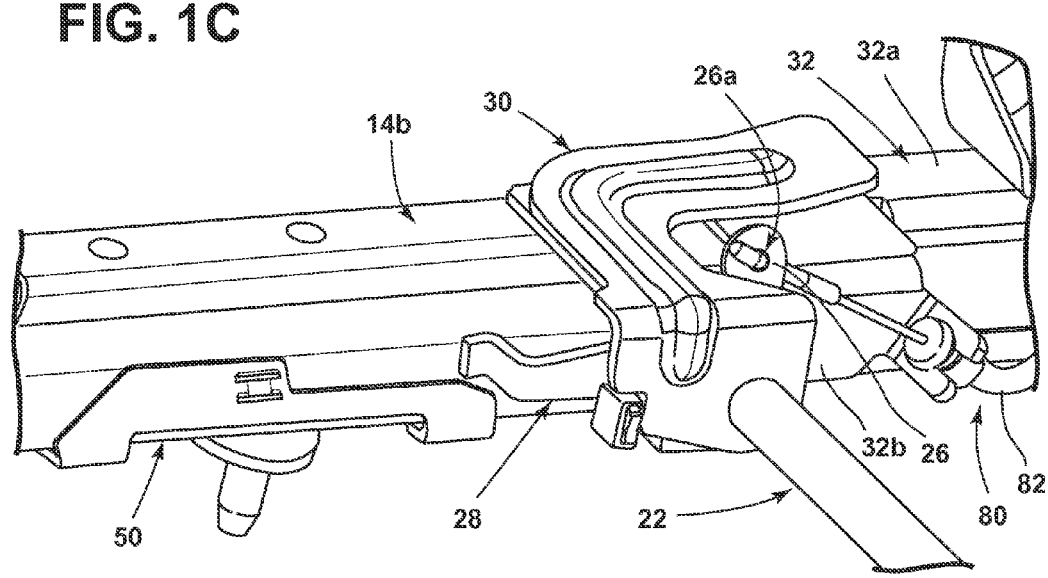
FIG. 2 is an enlarged perspective view generally illustrating portions of a vehicle seat adjuster, in accordance with embodiments of the present disclosure.
Figure 3C:
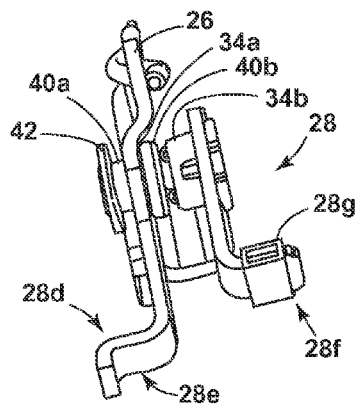
FIGS. 3C and 3D are perspective views generally illustrating portions of easy entry levers and easy entry lever activators, in accordance with embodiments of the present disclosure.
Figure 3D:
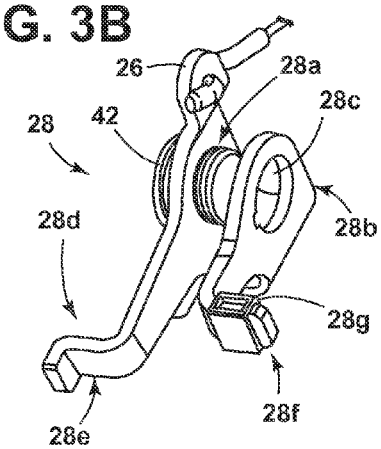
Figure 7:
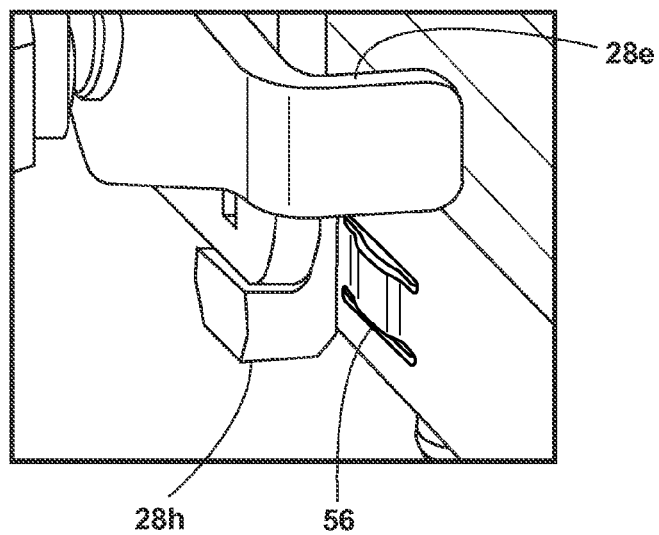
FIG. 7 is a perspective view generally illustrating portions of a vehicle seat adjuster, in accordance with embodiments of the present disclosure.
Figure 8:
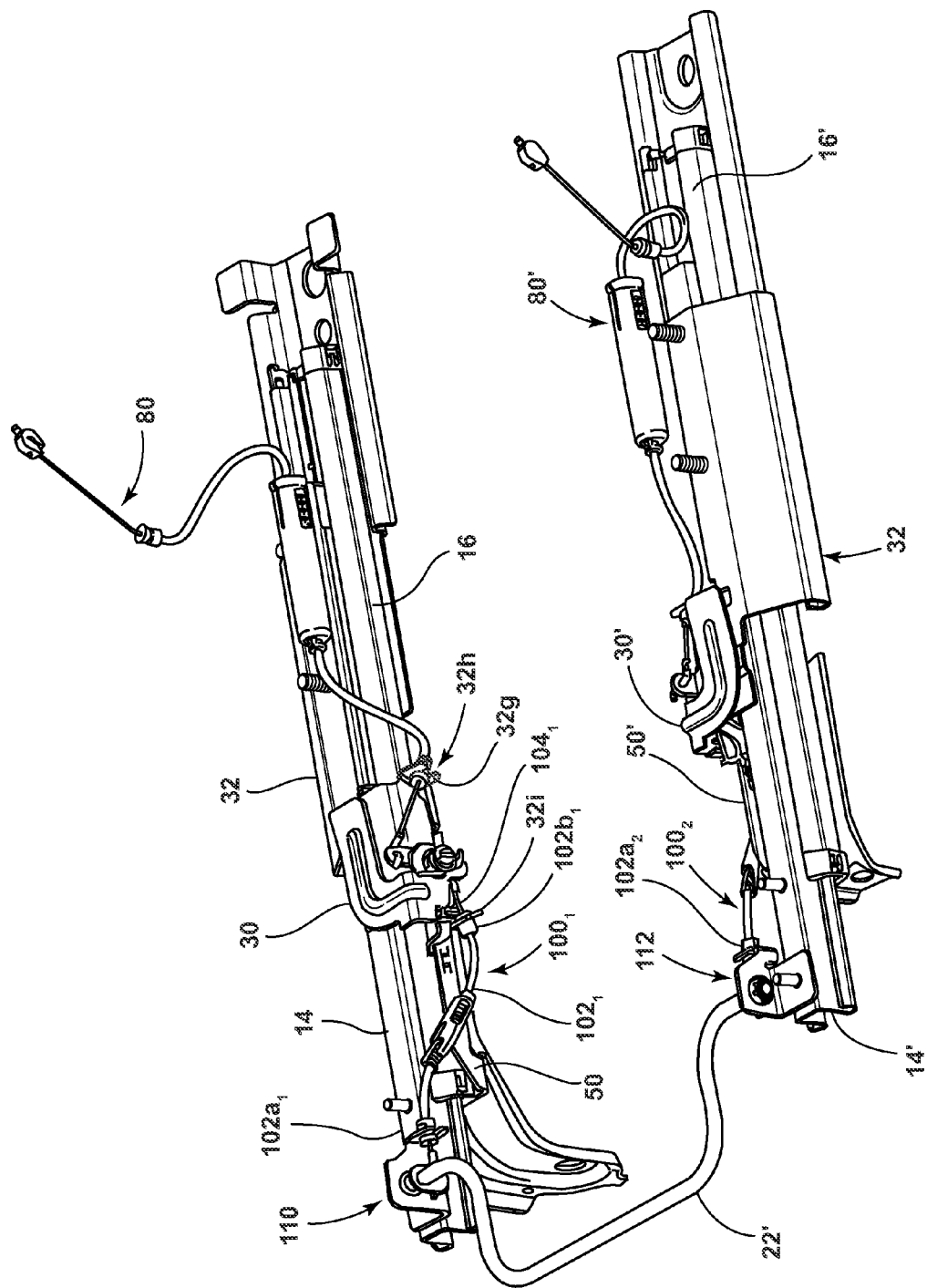
FIG. 8 is a perspective view generally illustrating portions of a vehicle seat adjuster, in accordance with embodiments of the present disclosure.
Figure 9:
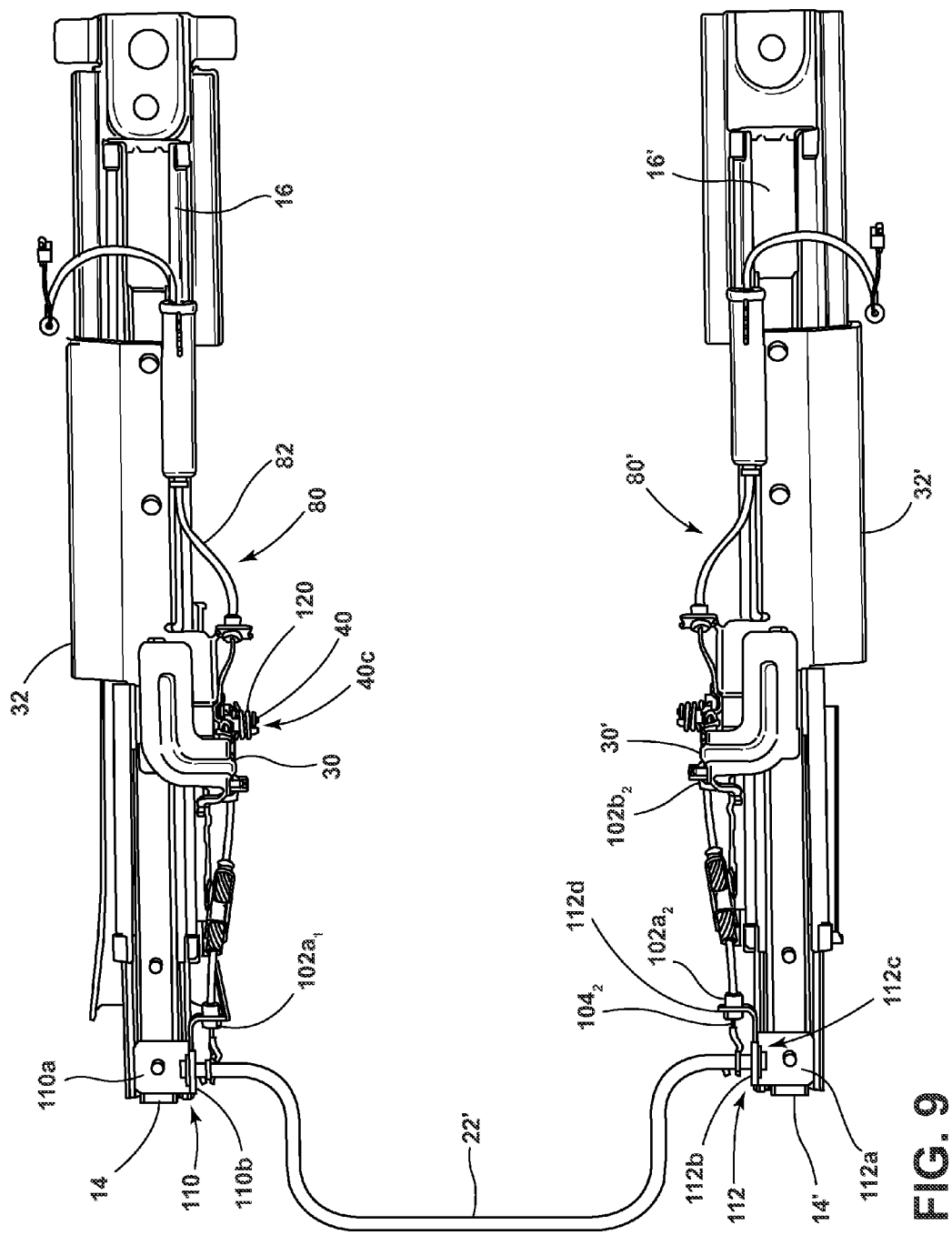
FIG. 9 is a top view generally illustrating portions of a vehicle seat adjuster, in accordance with embodiments of the present disclosure.

In embodiments, EE lever 28 may include a protrusion 28d that may extend generally parallel to longitudinal direction L of the first and second tracks 14, 16 (see, e.g., FIGS. 3C, 3D, and 7). EE lever protrusion 28d may be generally straight and/or may include at least one angled portion 28e. Angled portion 28e may be configured to contact end stop bracket intermediate vertical portion 54g to restrict relative movement between the first and second tracks 14, 16 in at least one position of EE lever 28. For example, and without limitation, if EE lever 28 is in a lowered position (e.g., as generally illustrated in FIG. 2) and vehicle seat portion 10 slides forward toward the front of a vehicle to the front end 54d of a comfort range, protrusion 28d may contact intermediate vertical portion 54g, preventing further forward movement of the seat portion 10. If EE lever 28 is rotated to a raised position (e.g., as generally illustrated in FIG. 5A), protrusion 28d may be raised above a height of upper portion 54f and out of contact with intermediate portion 54g, which may allow further forward movement of vehicle seat portion 10 into EE range 18b. EE range 18b may correspond to a range of positions into which vehicle seat portion 10 may move to facilitate ingress and/or egress from a vehicle, but in which locking device 20 may not restrict relative movement between the first and second tracks 14, 16.

In embodiments, a comfort range resting position (e.g., a lowered position, as generally illustrated in FIG. 2) of EE lever 28 may correspond to at least a portion of EE lever protrusion 28d being at or below a height of lower portion 54e of end stop bracket 50. As vehicle seat portion 10 moves forward, protrusion 28d may contact upwardly ramped portion 54a, which may cause EE lever 28 to rotate upward and may cause protrusion 28d to rise above a height of lower portion 54e.

In embodiments, such as generally illustrated in FIGS. 5D and 7, end stop bracket 50 may include a movement restricting portion 56. For example, and without limitation, movement restricting portion 56 may extend outwardly from a side of generally vertical portion 54 of end stop bracket 50. Movement restricting portion 56 may slow sliding movement of vehicle seat portion 10 in at least one direction, such as, without limitation, when vehicle seat portion 10 slides rearward from the EE range 18b toward the comfort range 18a. Such slowing of the sliding movement of the vehicle seat portion 10 may help cause vehicle seat portion 10 to lock at the frontmost position of comfort range 18a as the vehicle seat portion 10 returns from the EE range 18b. For example, and without limitation, the slowed movement of the seat portion 10 may help cause the seatback 10b to return to a generally vertical seating position as the seat portion 10 approaches the comfort range, which may rotate EE lever 28 and/or comfort lever activator 30 toward resting positions, allowing the locking device 20 and/or lockset 60 to restrict relative movement between the first and second tracks 14, 16. EE lever 28 and/or generally vertical portion 32b of EE base bracket 32 may include a movement restriction element 28h that may cooperate and/or engage with movement restricting portion 56. Movement restriction element 28h may include a flexible material, such as, for example, rubber. Movement restriction element 28h may be configured to come into contact a raised portion 56a of movement restricting portion 56. Raised portion 56a may be disposed adjacent to and/or between aperture 56b and/or aperture 56c.

Figure 1C:
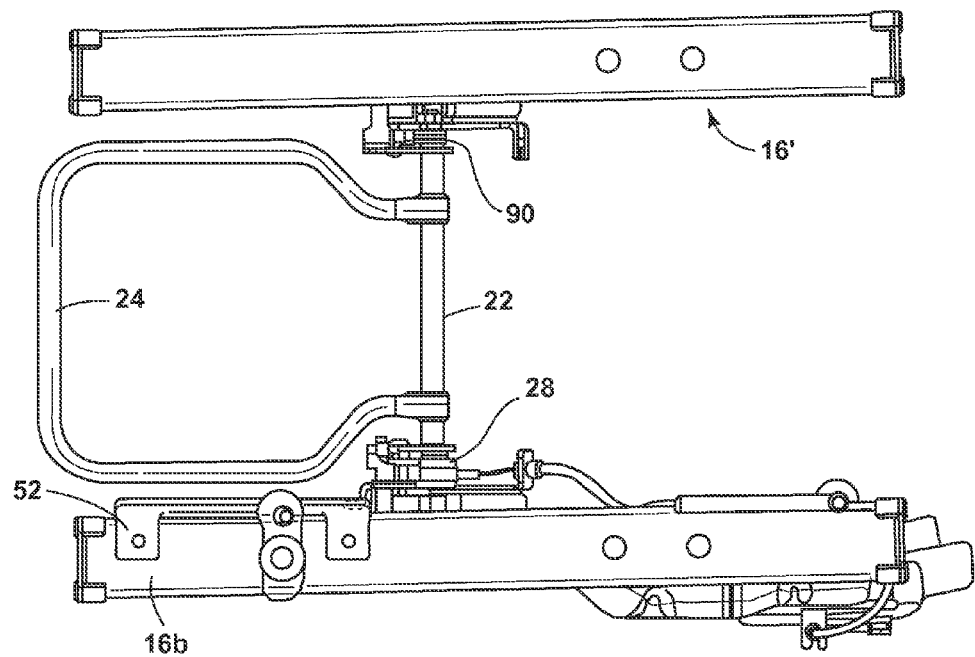
FIG. 1C is a bottom view generally illustrating portions of a vehicle seat adjuster, in accordance with embodiments of the present disclosure.

In embodiments, seat adjuster 12 may include a biasing member 90 that may be configured to bias cross member 22, handle 24, EE lever 28, and/or comfort lever activator 30 in a forward direction, which may correspond to lock plates 66 being in the first position, which may restrict movement of seat portion 10. Biasing member 90 may be disposed at least partially around cross member 22. As generally illustrated in FIG. 1C, biasing member 90 may be arranged at a distance from EE lever 28 and/or may not contact any portion of EE lever 28 and/or comfort lever activator 30. For example, and without limitation, EE lever 28 and comfort lever activator 30 may be disposed at or near a first pair of tracks (e.g., tracks 14, 16) and/or biasing member 90 may be disposed at or near a second pair of tracks (e.g., tracks 14', 16'). Biasing member 90 may include more than one biasing member. In embodiments, biasing member 90 may be the only biasing member included in seat adjuster 12.

In embodiments, an occupant may be able to actuate handle 24 to slide vehicle seat portion 10 between the frontmost and rearmost positions in comfort range 18a. For example, an occupant may lift upward on handle 24, which may overcome the force of biasing member 90, causing cross member 22 to rotate, which may cause comfort lever activator 30 to rotate toward the tracks and engage the lockset 60, which may allow seat portion 10 to slide. If the occupant slides seat portion 10 to the frontmost position in the comfort range, a front portion of the EE lever 28 (e.g., angled portion 28e) may contact end stop bracket 50, which may prevent further forward sliding of the seat portion 10.

In embodiments, such as generally illustrated in FIGS. 5A, 5B, and 5C, an occupant may actuate the comfort lever activator 30 via the EE lever activator 26, which may permit sliding of first tracks 14, 14' beyond comfort range 18a and/or into EE range 18b. Movement of the seatback 10b may cause actuation of EE lever 28. For example, and without limitation, an occupant may cause movement of the EE lever activator 26 via movement of the seatback 10b, such that rotation of the seatback 10b causes a connection member 80 to rotate EE lever activator 26. Connection member 80 may include one or more of a cable, rod, and/or lever linkage and may be connected to EE lever activator 26 via EE lever activator aperture 28a. Rotation of EE lever activator 26 may cause EE lever 28 to rotate, which may lift angled portion 28e out of engagement with and/or above end stop bracket upper portion 54f, which may cause comfort lever activator 30 to contact the lockset 60 (e.g., at protrusion 62a) and/or may allow first tracks 14, 14' to slide farther forward into EE range 18b.

Figure 6A:
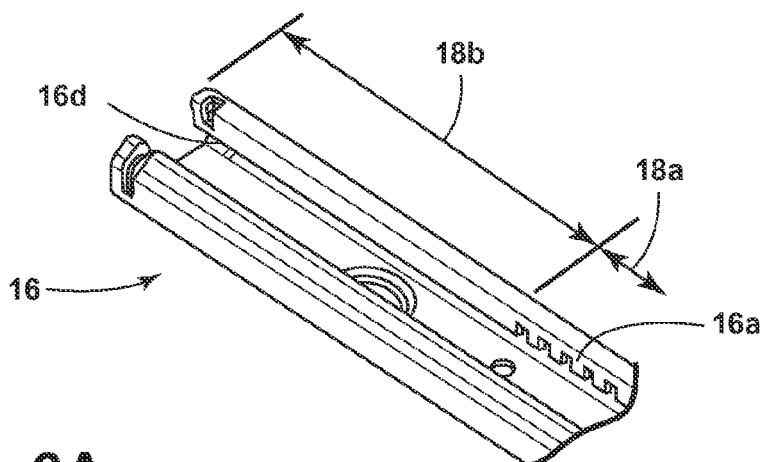
FIGS. 6A and 6B are perspective views generally illustrating portions of end stop brackets of a vehicle seat adjuster, in accordance with embodiments of the present disclosure.
Figure 6B:
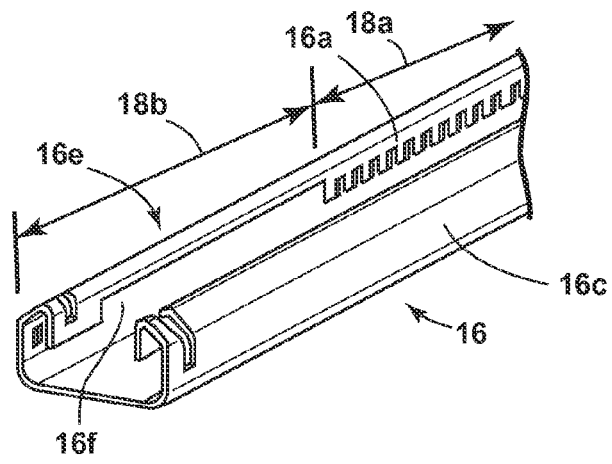

In embodiments, such as generally illustrated in FIGS. 6A and 6B, second tracks 16, 16' may include one or more engagement portions 16a. In embodiments, second tracks 16, 16' may include portions that do not include engagement portions, which may correspond to EE range 18b. For example, and without limitation, portion 16d of second track 16 may not include engagement portions. Portion 16d may allow seat portion 10 to move within EE range 18b even if EE lever activator 26 is no longer being actuated (e.g., even if seatback 10b is returned to a generally upright position). Portion 16d may be configured such that lock plates 66 may be in contact with second track 16 (e.g., slide along the lower edge) when seat 10 is in EE range 18b.

As generally illustrated in FIG. 6B, second tracks 16, 16' may include a portion 16e that may not include engagement portions, but may include an elongated recess 16f. Portion 16e and/or elongated recess 16f may be configured such that lock plates 66 may not be in contact with second track 16 when seat 10 is in EE range 18b.

Adjuster 12 may be described herein in connection with first track 14, second track 16, and/or associated components, but, in embodiments, adjuster 12 may include complementary components associated with first track 14' and/or second track 16'. For example, and without limitation, a configuration of adjuster 12 associated with tracks 14, 16 may be generally mirrored for tracks 14', 16', such that adjuster may include a second locking device 20', a second EE lever 28', a second comfort lever activator 30', a second EE base bracket 32', a second connecting member 40', a second end stop bracket 50', a second lockset 60', a second connection member 80', a second spring 120', and/or other components.

In embodiments, such as generally illustrated in FIGS. 8, 9, 11, 12, and 15-18, a cross member 22' may be indirectly connected to comfort lever activator 30, such as via one or more front connection members (e.g., members $100_1$, $100_2$), which may include cables (e.g., Bowden cables). Connection members $100_1$, $100_2$ may be referred to herein as cables $100_1$, $100_2$ and/or cross member cables $100_1$, $100_2$, but are not limited to cables. In embodiments, upon actuation of cross member 22' (e.g., by being pulled up/rotated by a vehicle occupant), cross member 22' may pull on cables $100_1$, $100_2$, which may activate/rotate comfort lever activator 30, which may actuate (e.g., unlock) lockset 60. In embodiments, cross member 22' may be disposed at or near (e.g., proximate) the front of the upper tracks, and/or cables $100_1$, $100_2$ may be configured to connect cross member 22' to comfort lever activator 30 (and/or comfort lever activator 30'), which may be disposed at a distance from cross member 22' (e.g., comfort lever activators 30, 30' may be disposed at or near the middle of first tracks 14, 14'). In embodiments, cross member 22' may include one or more flanges (e.g., flanges $22a_1$, $22a_2$) that may be configured for connection with connection members $100_1$, $100_2$. In embodiment, cross member 22' may include one or more cross member stop flanges (e.g., stop flanges $22b_1$, $22b_2$) that may extend (e.g., perpendicularly) from cross member bracket vertical portions 110b, 112b, respectively (see, e.g., FIGS. 17B and 17C).

In embodiments, cross member 22' may be rotatably connected to upper track 14 via one or more cross member brackets (e.g., brackets 110, 112). In embodiments, brackets 110, 112 may be connected to and/or fixed to first tracks 14, 14'. Brackets 110, 112 may, for example, include generally L-shaped configurations, which may include generally horizontal bases 110a, 112a and generally vertical portions 110b, 112b. In embodiments, horizontal bases 110a, 112a may be configured for connecting brackets 110, 112 to first tracks 14, 14' and/or may be disposed adjacent to first tracks 14, 14'. In embodiments, vertical portions 110B, 112b may extend upward from bases 110a, 112a and may be disposed generally parallel with longitudinal direction L. In embodiments, vertical portions 110b, 112b may include recesses 110c, 112c, respectively, that may be configured to rotatably support cross member 22', which may include receiving at least a portion of cross member 22'.

In embodiments, such as generally illustrated in FIGS. 8, 9, 11-18, cross member brackets 110, 112 may be configured to retain sheaths of cable $100_1$, $100_2$. In embodiments, cross member bracket 110 may include a retainer 110D that may be configured to hold a first end $102a_1$ of a sheath $102_1$ of cable $100_1$. In embodiments, cross member bracket 112 may include a retainer 112d that may be configured to hold a first end $102a_2$ of a sheath $102_2$ of cable $100_2$. First ends $102a_1$, $102a_2$ may connect cross member 22' to the comfort lever activators 30, 30', respectively. In embodiments, base bracket 32 may include a retainer 32i that may be configured to retain a second end $102b_1$ of sheath $102_1$ and retainer 32i may, for example, include a forked configuration that may allow sheath $102_1$ to slide into retainer 32i. In embodiments, rotation of cross member 22' may cause movement of a core $104_1$ of cable $100_1$, but sheath $102_1$ may remain generally fixed relative to cross member bracket 110 and/or base bracket 32, which may include not translating in a forward or rearward direction. In embodiments, if cross member 22' is rotated, cross member 22' may cause movement of cables $100_1$, $100_2$ (e.g., core $104_1$, $104_2$) such that the cables $100_1$, $100_2$ pull and/or exert a force on comfort lever activators 30, 30', which may actuate cross member activator 30, 30' and/or disengage locksets 60, 60'. In embodiments, actuation of EE lever 28, such as via cable 80, may actuate comfort lever activator 30 via cross member actuator 28f, and cross member actuator 28f may or may not actuate cross member 22'. For example, and without limitation, cross member actuator 28f may rotate with EE lever 28 to cause rotation of comfort lever activator 30 (e.g., cross member actuator 28f and/or flexible member 28g may contact comfort lever activator), and cross member actuator 28f may or may not actuate cross member 22'. In embodiments, EE lever 28 may be generally planar and cross member actuator 28f may extend perpendicularly from EE lever 28. In embodiments, cross member brackets 110, 112 may include cross member stops 110e, 112e that may be configured to engage cross member stop flanges $22b_1$, $22b_2$, respectively, and may restrict rotational movement of cross member 22' in at least one direction (see, e.g., FIGS. 17B and 17C). In embodiments, base bracket 32' may include a retainer 32i' that may be configured to retain a second end $102b_2$ of sheath $102_2$ and retainers 32i, 32i' may, for example, include a forked configuration that may allow sheaths $102_1$, $102_2$ to slide into retainers 32i, 32i'.

In embodiments, comfort lever activator 30 may be rotatably supported on EE base bracket 32 via connecting member 40. For example, and without limitation, connecting member may extend through EE base bracket aperture 32d and EE lever aperture 28a.

Figure 10:
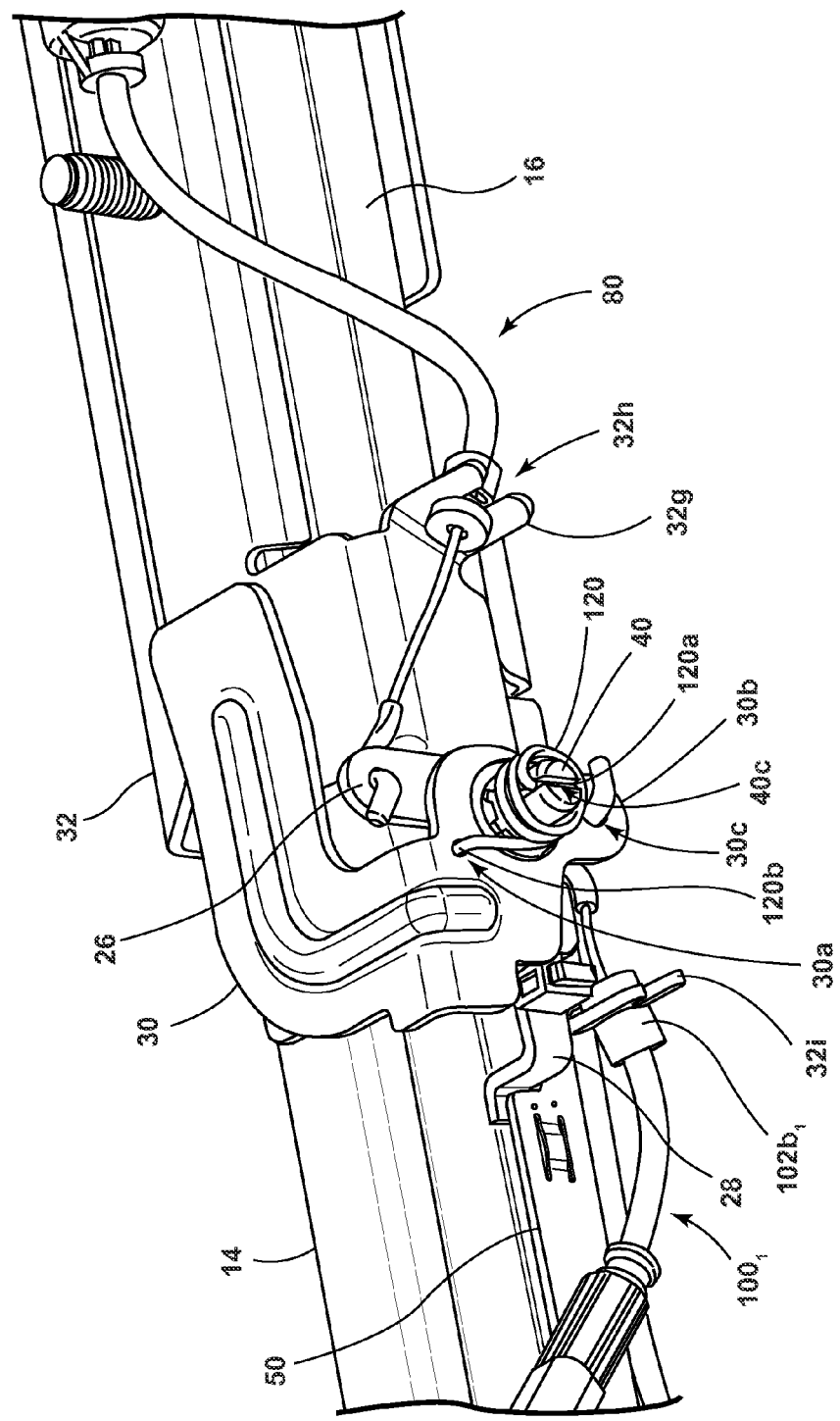
FIGS. 10 and 11 are perspective views generally illustrating portions of a vehicle seat adjuster, in accordance with embodiments of the present disclosure.
Figure 11:
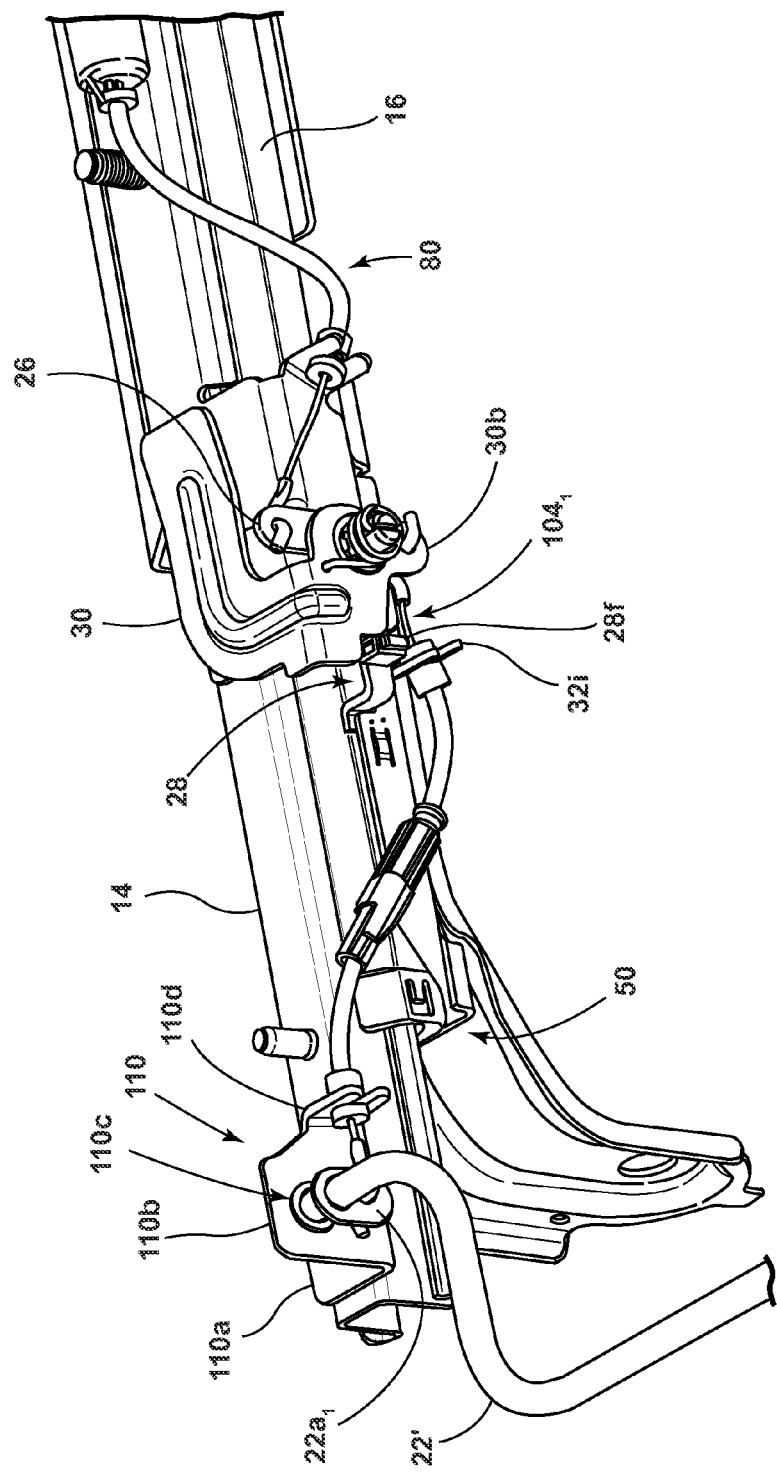
Figure 12:
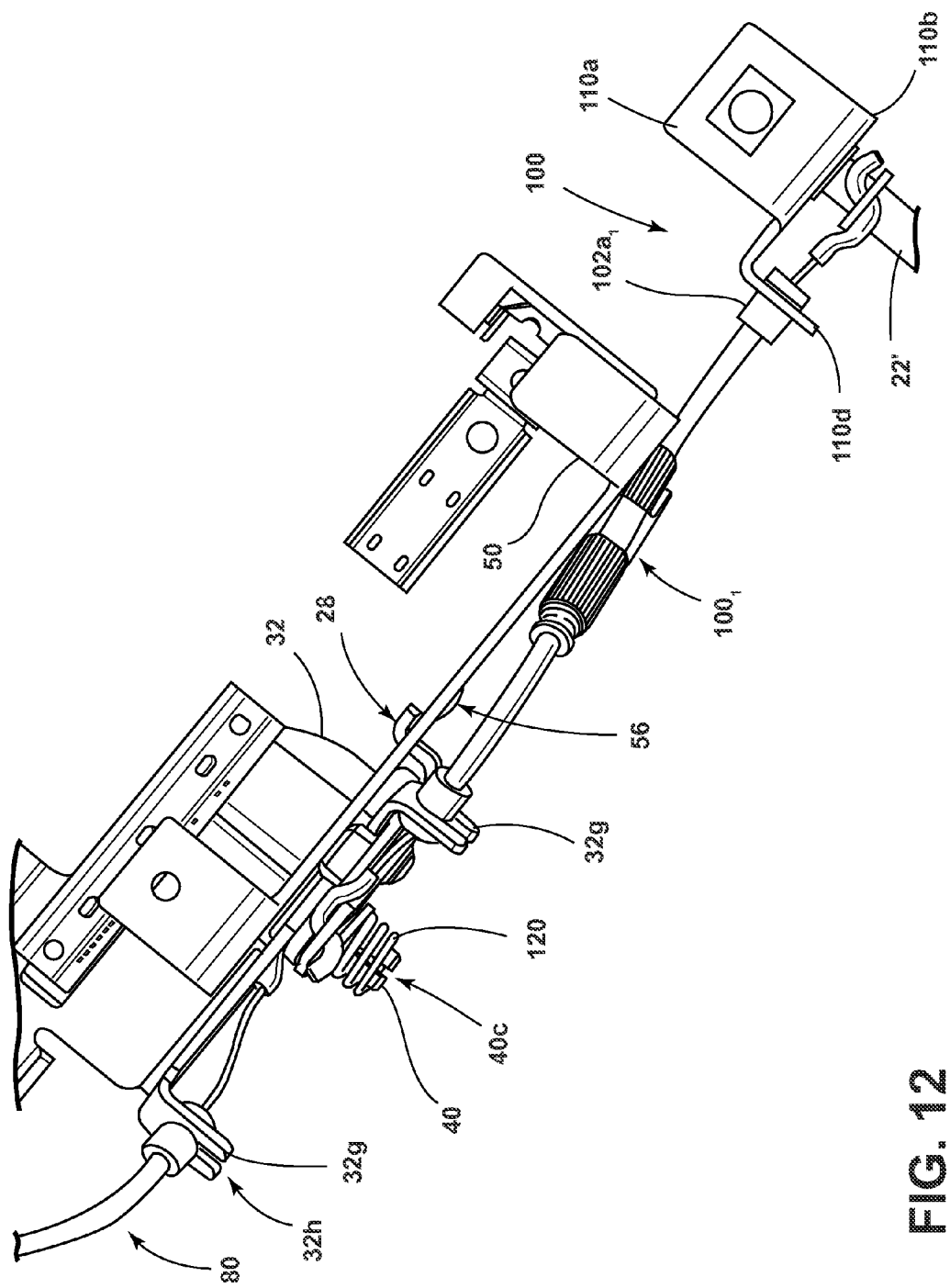
FIG. 12 is a bottom view generally illustrating portions of a vehicle seat adjuster, in accordance with embodiments of the present disclosure.
Figure 13:
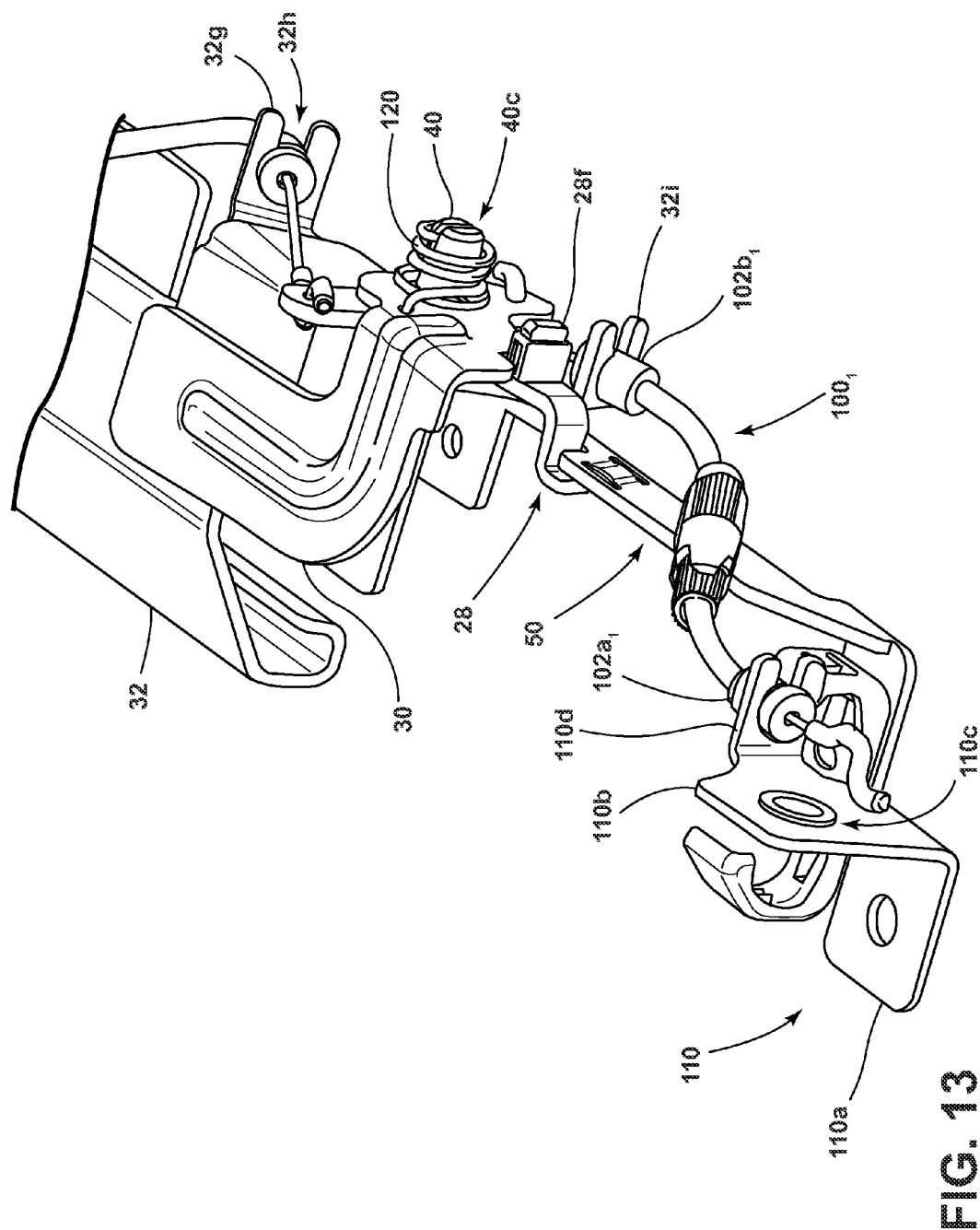
FIGS. 13-20 are perspective views generally illustrating portions of a vehicle seat adjuster, in accordance with embodiments of the present disclosure.
Figure 14:
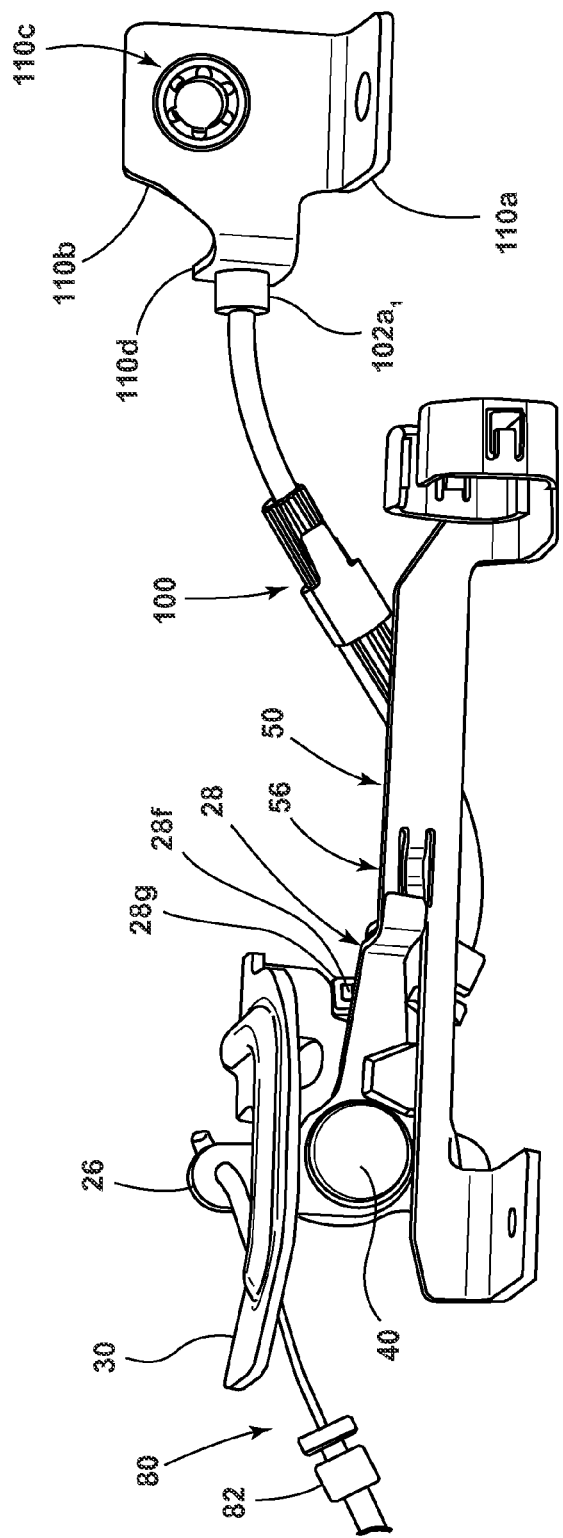
Figure 15:
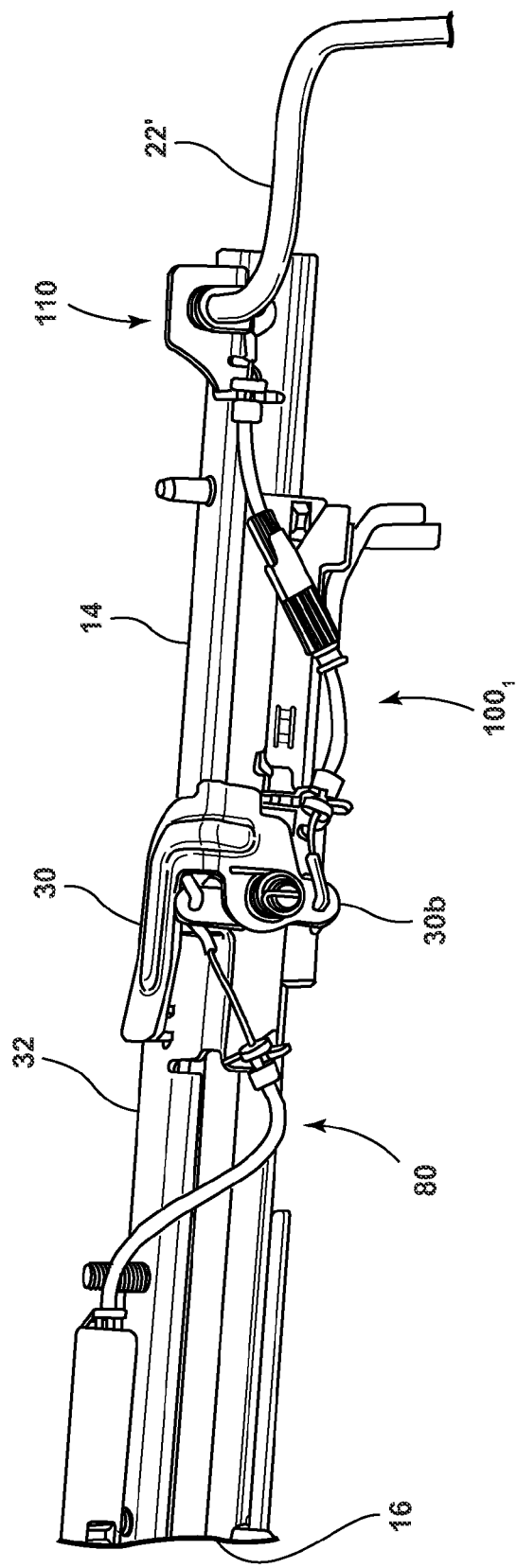
Figure 16:
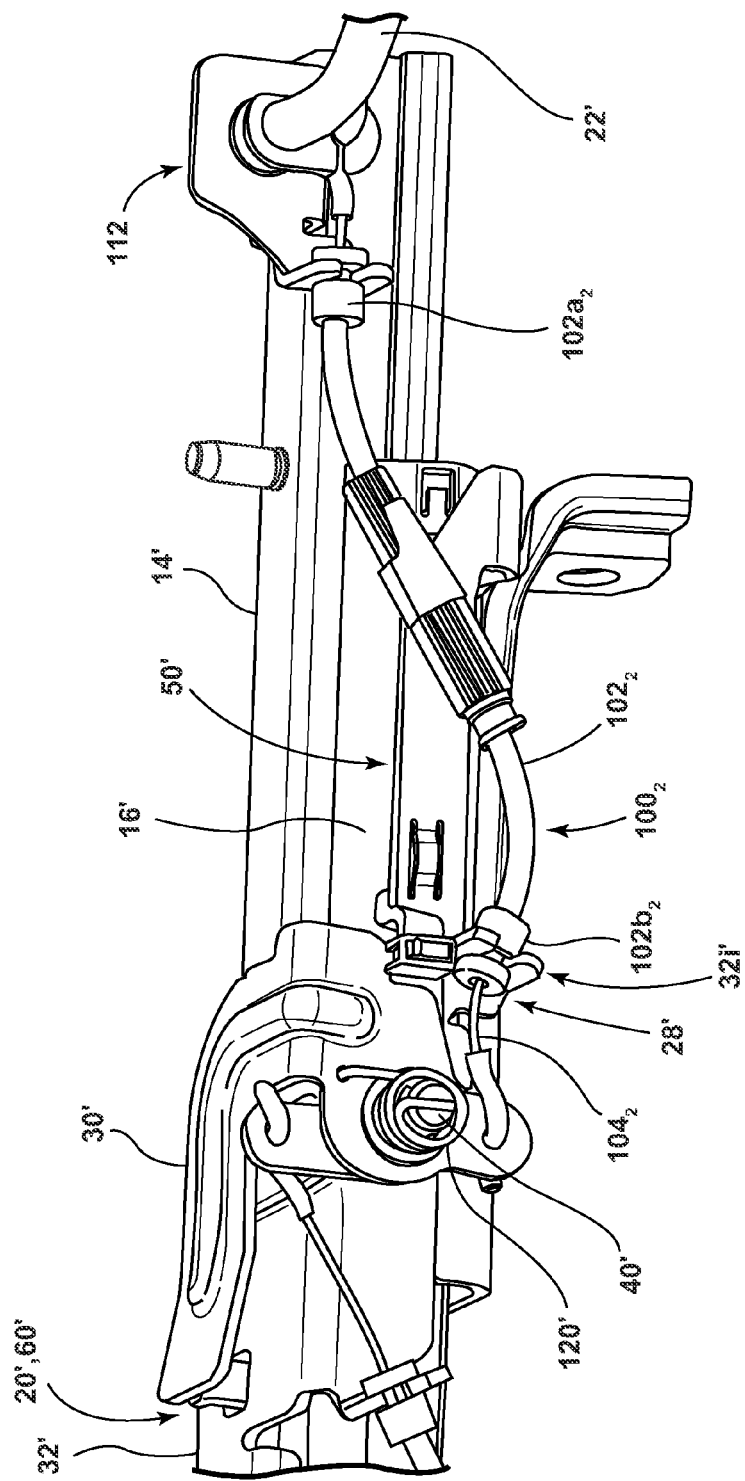
Figure 17A:
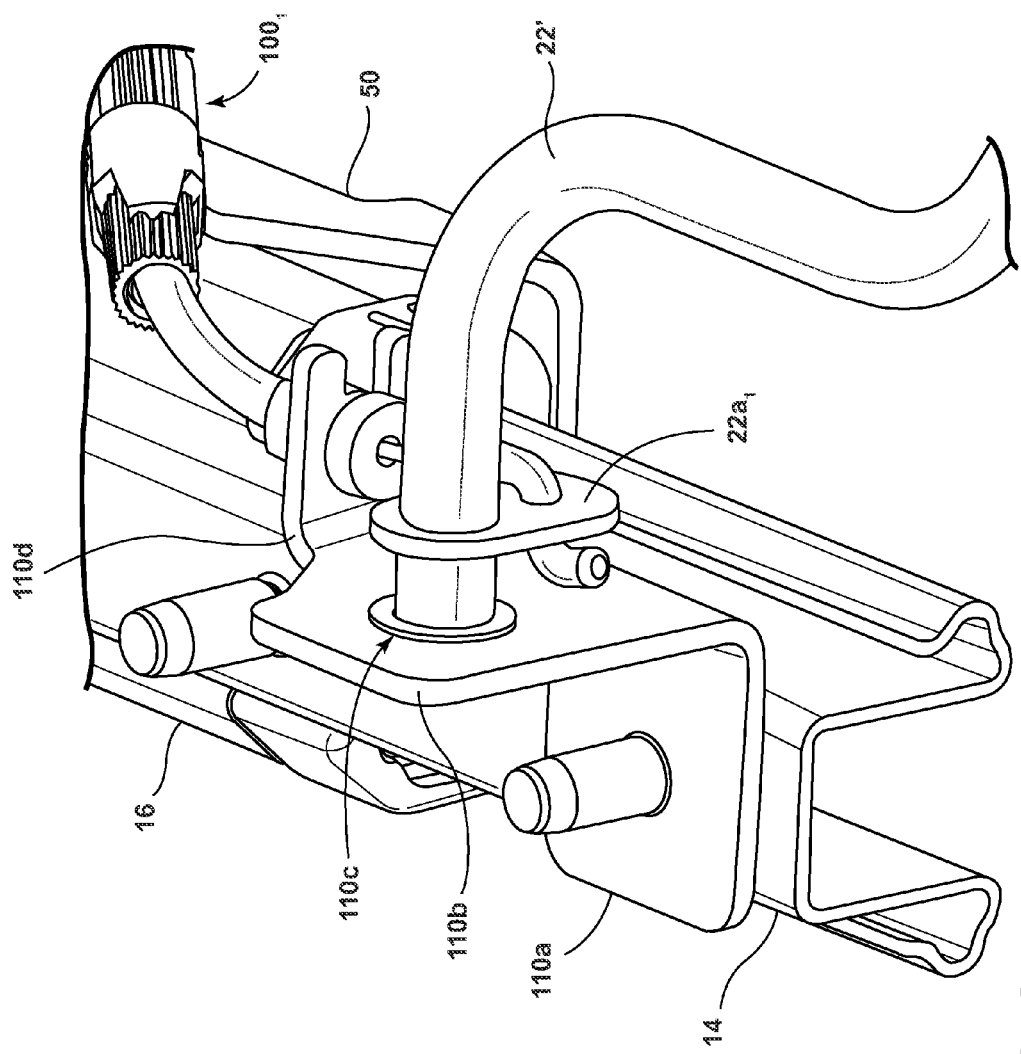
Figure 17B:
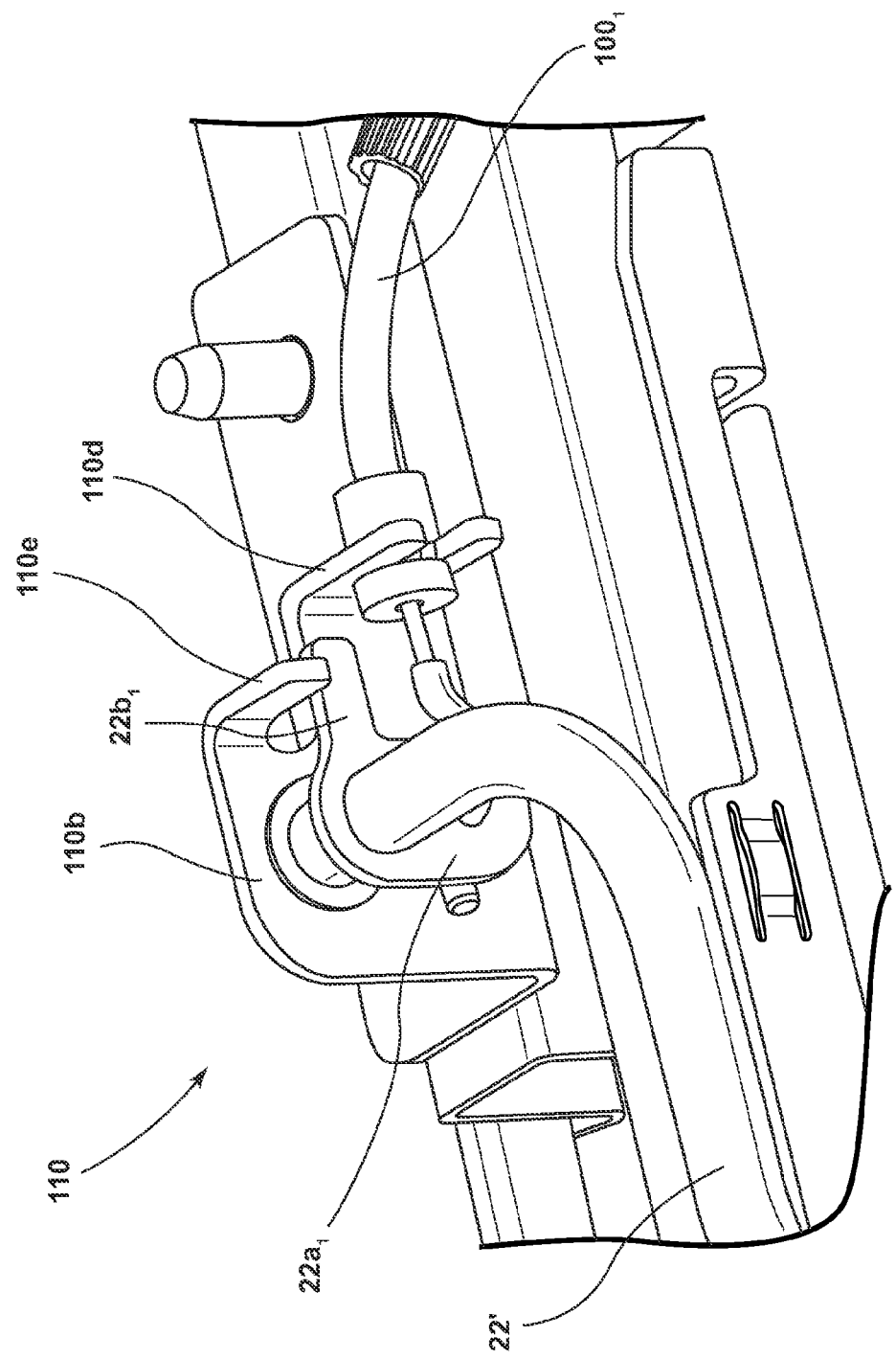
Figure 17C:
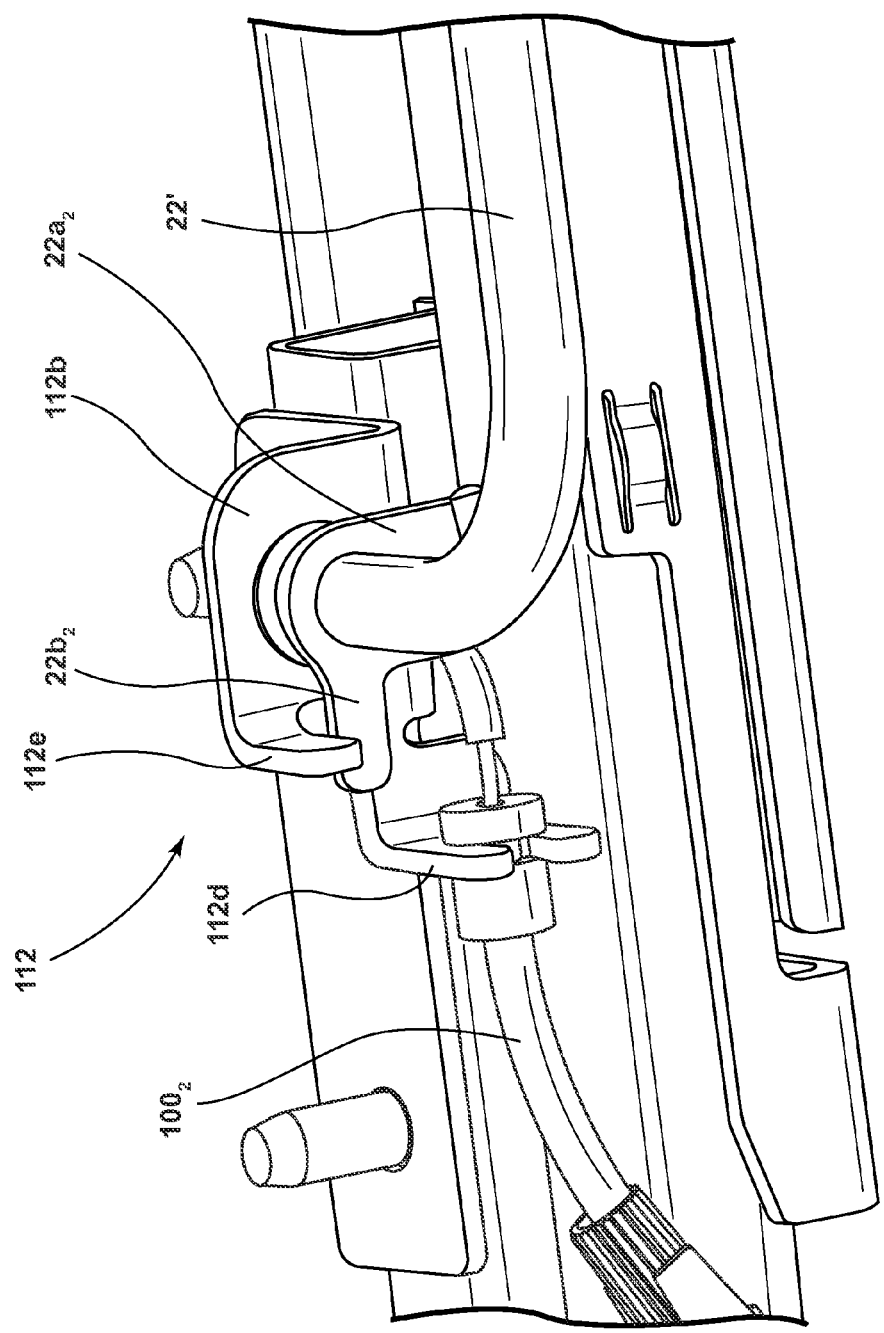
Figure 18:
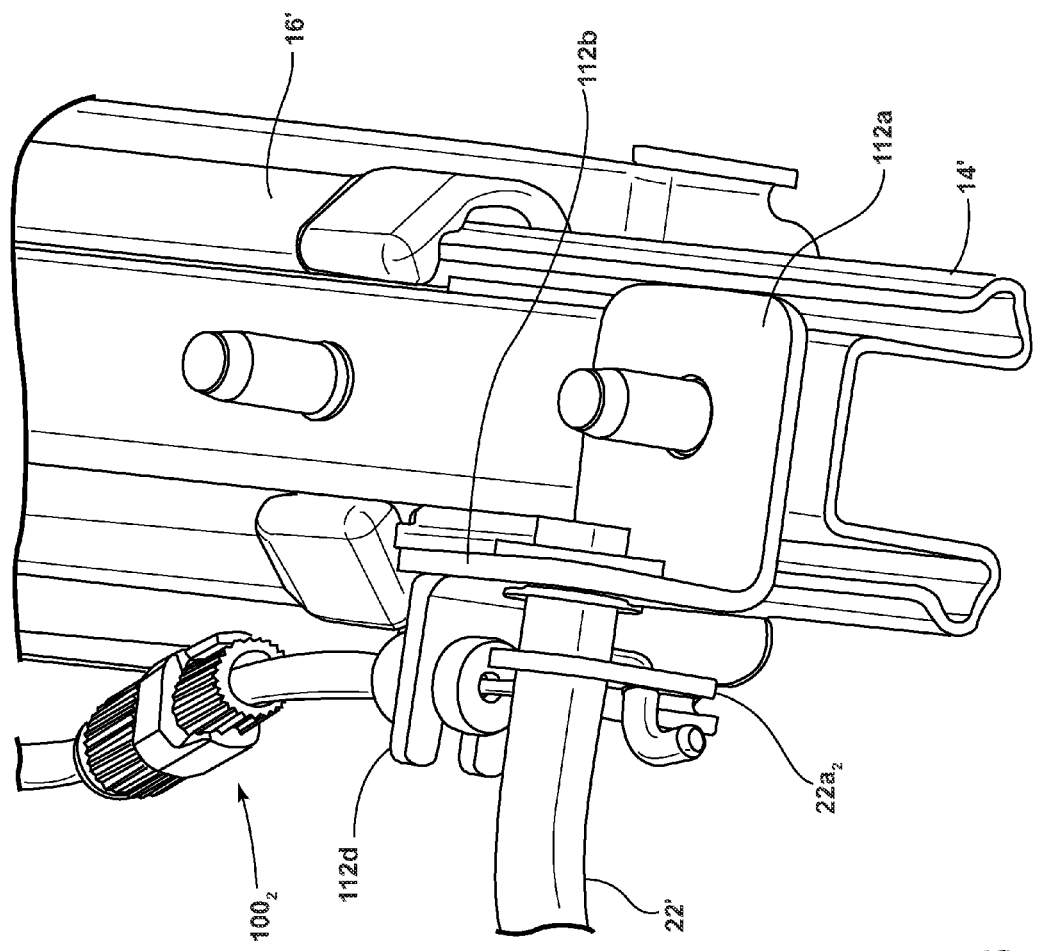
Figure 19:
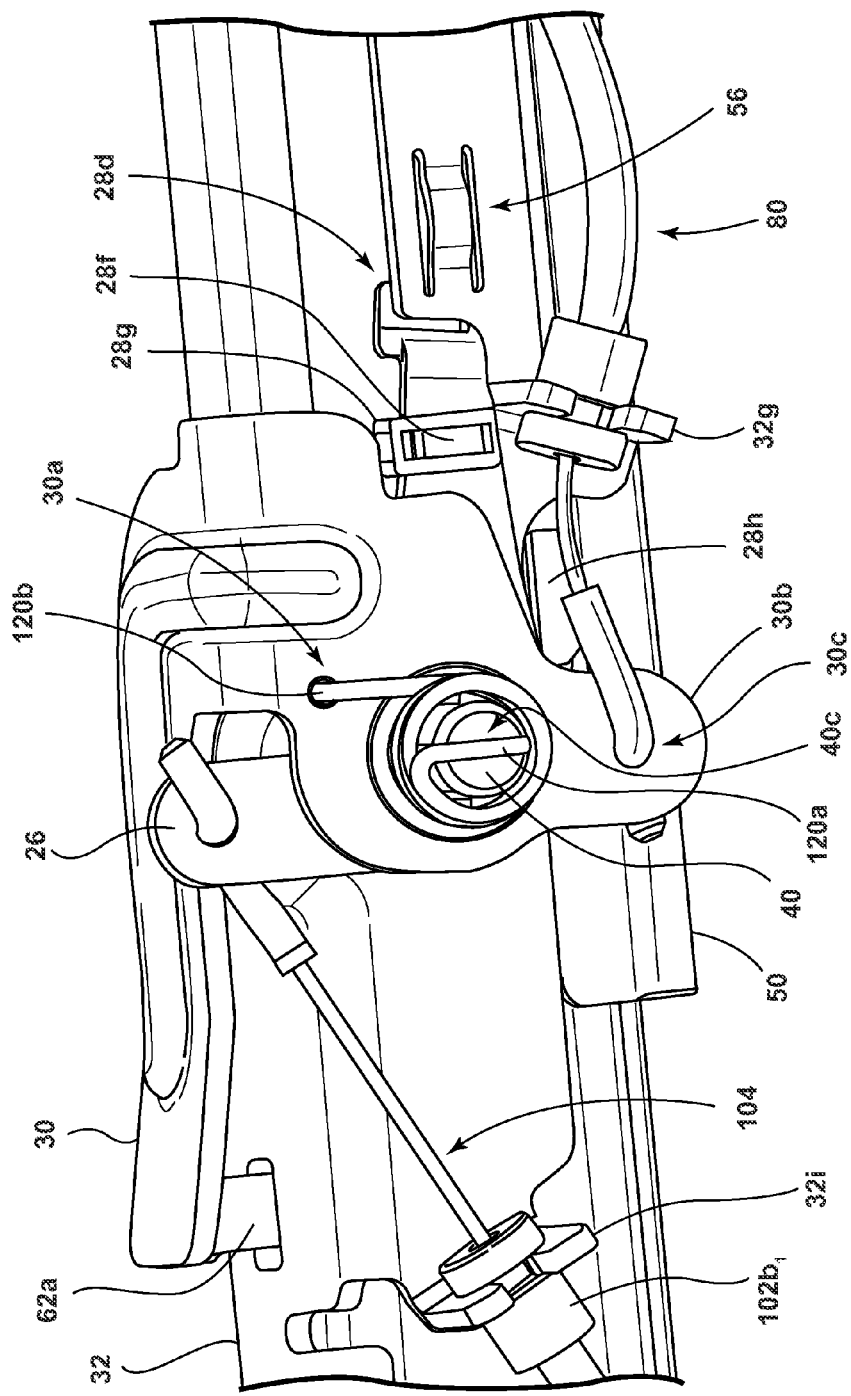
Figure 20:
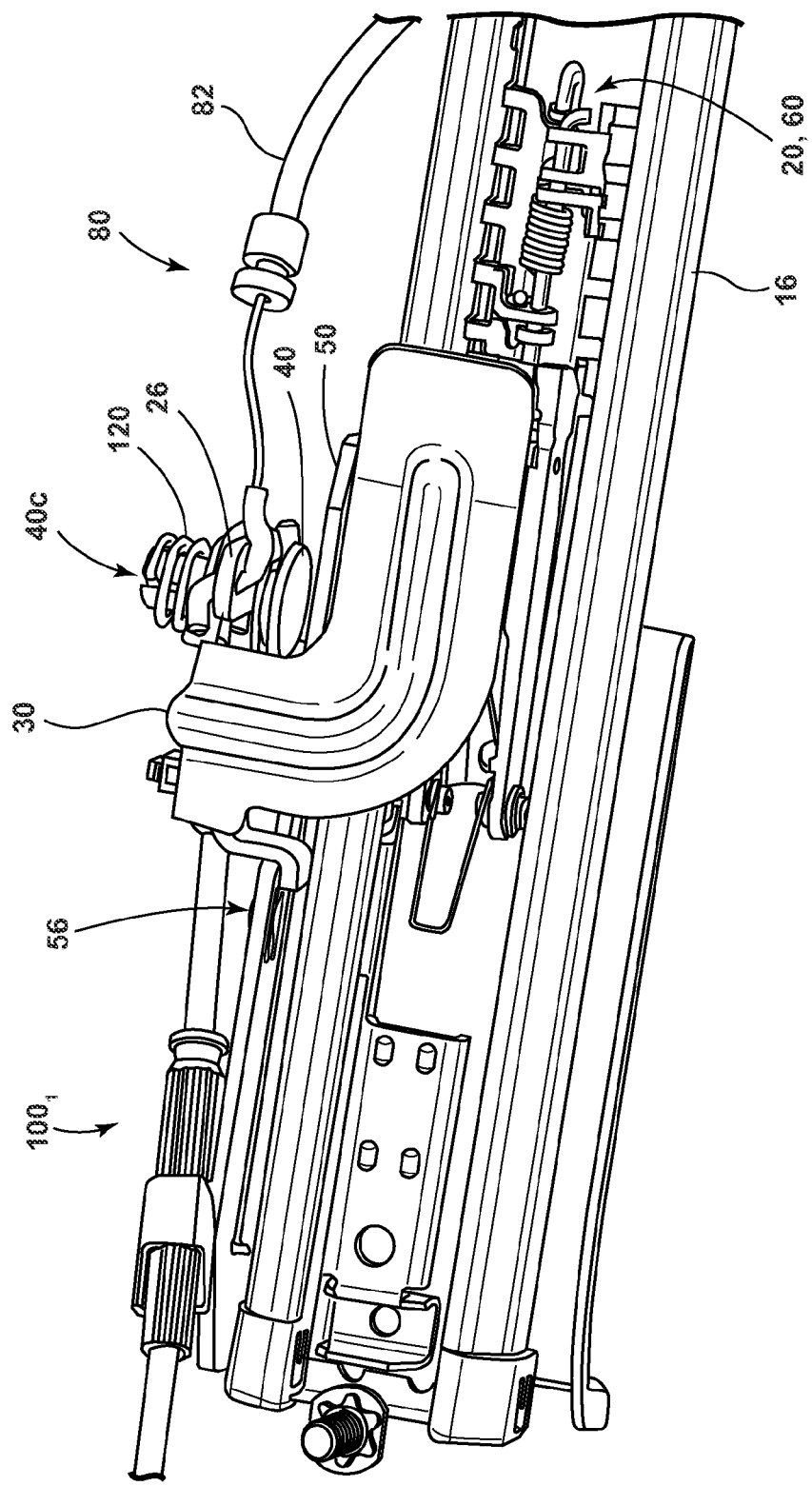

In embodiments, a spring 120 may be connected to connection member 80 and/or comfort lever activator 30 and may be configured to bias the comfort lever activator 30 to a resting position (see, e.g., FIGS. 10 and 11). For example, and without limitation, connecting member 40 may include a slot 40c to receive a first end 120a of spring 120 and/or comfort lever activator 30 may include an aperture 30a to receive a second end 120b of spring 120. In embodiments, connecting member 40 may be configured such that slot 40c extends (e.g., axially) beyond EE lever 28 to receive second end 120b of spring 120.

In embodiments, such as generally illustrated in FIGS. 10-13, 15, 16, and 19, comfort lever activator 30 may include a cable connecting portion 30b that may be extend, for example, generally vertically downward when comfort lever activator 30 is in a rest position (e.g., when comfort lever activator 30 is not unlocking lockset 60). In embodiments, cable connecting portion 30b may include a recess 30c that may be configured to connect with and/or receive at least a portion of cable $100_1$. For example, and without limitation, aperture 30c may receive a portion of core $104_1$, and upon actuation of cross member 22', core $104_1$ may be pulled and/or moved within sheath $102_1$ and may pull on comfort lever activator 30 via aperture 30c to cause rotation of comfort lever activator 30 and disengagement of locking device 20.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "embodiments," or the like, means that a particular feature, structure, or characteristic described in connection with the embodiment is included in at least one embodiment.

Thus, appearances of the phrases "in various embodiments," "in some embodiments," "in one embodiment," or "in embodiments," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. It should also be understood that references to a spring are not limited to a particular type of spring and may include, without limitation, any type of biasing member and/or material. Also, references to an occupant are not limited to a person in a vehicle or to a person sitting in a vehicle seat, and may include, without limitation, anything interacting with vehicle seat. It should be understood that although embodiments may be disclosed in connection with a vehicle seat, track adjuster 12 may be applied to a variety of applications.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A seat adjuster, comprising:
   an end stop bracket configured for connection with a fixed track;
   an easy entry lever;
   a comfort lever activator configured for connection or engagement with a lockset;
   a cross member bracket configured for connection with a movable track and configured to rotatably support a cross member; and
   a cross member cable connecting the comfort lever activator to said cross member such that rotation of said cross member causes the comfort lever activator to rotate and to connect with or engage said lockset;
   wherein the easy entry lever is configured to rotate between a first position in which the easy entry lever connects with or engages the end stop bracket and prevents movement of a seat from a comfort range into an easy entry range, and a second position in which the easy entry lever does not impede or prevent movement of the seat from the comfort range into the easy entry range.

2. The seat adjuster of claim 1, comprising a base bracket including a generally horizontal portion fixed to a top of said movable track and a vertical portion extending downward from the horizontal portion.

3. The seat adjuster of claim 2, wherein the base bracket includes a cross member cable retainer connected with a sheath of the cross member cable, wherein the cross member cable retainer extends laterally from an end of the vertical portion.

4. The seat adjuster of claim 3, wherein the base bracket includes an easy entry cable retainer configured to connect with or retain a sheath of an easy entry cable connected to the easy entry lever, wherein the easy entry cable retainer extends laterally from an opposite end of the vertical portion.

5. The seat adjuster of claim 1, further comprising a second cross member bracket, the second cross member bracket configured for connection with a second movable track and configured to rotatably support the cross member.

6. The seat adjuster of claim 2, wherein said lockset includes a protrusion that extends through an aperture in said movable track and through an aperture in the horizontal portion of the base bracket.

7. The seat adjuster of claim 6, wherein the comfort lever activator engaging said lockset includes the comfort lever activator contacting the protrusion.

8. The seat adjuster of claim 1, wherein the cross member bracket is disposed proximate a front of said movable track and fixed to a top of said movable track.

9. A vehicle seat adjuster, comprising:
   a first fixed track;
   a second fixed track;
   a first movable track coupled to slide relative to the first fixed track;
   a second movable track coupled to slide relative to the second fixed track;
   an end stop bracket connected to the first fixed track;
   an easy entry lever connected to the first movable track;
   a cross member;
   a comfort lever activator connected to the first movable track and configured for connection or engagement with a lockset;
   a first cross member bracket, the first cross member bracket connected to the first movable track and configured to rotatably support a first end of the cross member;
   a second cross member bracket, the second cross member bracket connected to the second movable track and configured to rotatably support a second end of the cross member; and
   a cross member cable connecting the comfort lever activator to said cross member such that rotation of said cross member causes the comfort lever activator to rotate and to connect with or engage said lockset;
   wherein the easy entry lever is configured to rotate between a first position in which the easy entry lever engages the end stop bracket and impedes or prevents movement of the first movable track from a comfort range into an easy entry range, and a second position in which the easy entry lever does not prevent movement of the first movable track from the comfort range into the easy entry range.

10. The vehicle seat adjuster of claim 9, wherein the end stop bracket is a first end stop bracket and is fixed to a bottom of the first fixed track, and the vehicle seat adjuster further comprises a second end stop bracket, the second end stop bracket connected to the second fixed track.

11. The vehicle seat adjuster of claim 9, wherein the comfort lever activator is a first comfort lever activator, said lockset is a first lockset, the vehicle seat adjuster further comprises a second comfort lever activator, and the second comfort lever activator is connected to the second movable track and is configured for connection or engagement with a second lockset; and wherein the easy entry lever and the first comfort lever activator are configured to rotate independently about a common axis.

12. The vehicle seat adjuster of claim 11, wherein the cross member cable is a first cross member cable, the vehicle seat adjuster further comprises a second cross member cable, and the second cross member cable is connected between the cross member and the second comfort lever activator.

13. The vehicle seat adjuster of claim 12, comprising (i) a first base bracket including a generally horizontal portion connected to a top of the first movable track and a vertical portion extending downward from the horizontal portion, and (ii) a second base bracket including a generally horizontal portion connected to a top of the second movable track and a vertical portion extending downward from the horizontal portion.

14. The vehicle seat adjuster of claim 13, wherein the first base bracket includes a first cross member cable retainer configured to retain a sheath of the first cross member cable; and, the second base bracket includes a second cross member cable retainer configured to retain a sheath of the second cross member cable.

15. The vehicle seat adjuster of claim 14, wherein the first base bracket includes a first easy entry cable retainer configured to retain a sheath of a first easy entry cable; and, the second base bracket includes a second easy entry cable retainer configured to retain a sheath of a second easy entry cable.

16. The vehicle seat adjuster of claim 13, wherein said first lockset is disposed between said first movable track and said first fixed track; and, said second lockset is disposed between said second movable track and said second fixed track.

17. The vehicle seat adjuster of claim 16, wherein said first lockset includes a protrusion that extends through an aperture in said first movable track and through an aperture in the horizontal portion of the first base bracket.

18. The vehicle seat adjuster of claim 17, wherein connection or engagement of the first comfort lever activator with said first lockset includes the first comfort lever activator contacting the protrusion of said first lockset.

19. The vehicle seat adjuster of claim 9, wherein the first cross member bracket is disposed proximate a front of the first movable track and the second cross member bracket is disposed proximate a front of the second movable track.

20. A seat adjuster, comprising:
an end stop bracket fixed to a fixed track;
a comfort lever activator connected to a movable track and configured for connection or engagement with a lockset;
a cross member cable including a first end connected to the comfort lever activator and a second end configured for connection with a cross member such that rotation of said cross member causes the comfort lever activator to rotate and to connect with or engage said lockset;
an easy entry lever configured to actuate the comfort lever activator; and
an easy entry cable connected to the east entry lever and configured to cause rotation of the easy entry lever to actuate the comfort lever activator;
wherein the easy entry lever is configured to rotate between a first position in which the easy entry lever connects with or engages the end stop bracket and prevents movement of a seat from a comfort range into an easy entry range, and a second position in which the easy entry lever does not impede or prevent movement of the seat from the comfort range into the easy entry range.

* * * * *

UNITED STATES PATENT AND TRADEMARK OFFICE
CERTIFICATE OF CORRECTION

PATENT NO. : 9,776,532 B2
APPLICATION NO. : 14/959557
DATED : October 3, 2017
INVENTOR(S) : Stutika et al.

Page 1 of 1

It is certified that error appears in the above-identified patent and that said Letters Patent is hereby corrected as shown below:

In the Claims

At Column 14, Claim number 20, Line number 23, delete the word "east" and insert the word --easy--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*